US010154496B2

(12) United States Patent
Stirling-Gallacher

(10) Patent No.: US 10,154,496 B2
(45) Date of Patent: Dec. 11, 2018

(54) SYSTEM AND METHOD FOR BEAMFORMED REFERENCE SIGNALS IN THREE DIMENSIONAL MULTIPLE INPUT MULTIPLE OUTPUT COMMUNICATIONS SYSTEMS

(71) Applicant: Futurewei Technologies, Inc., Plano, TX (US)

(72) Inventor: Richard Stirling-Gallacher, San Diego, CA (US)

(73) Assignee: Futurewei Technologies, Inc., Plano, TX (US)

(*) Notice: Subject to any disclaimer, the term of this patent is extended or adjusted under 35 U.S.C. 154(b) by 104 days.

(21) Appl. No.: 15/443,066

(22) Filed: Feb. 27, 2017

(65) Prior Publication Data

US 2018/0132217 A1 May 10, 2018

Related U.S. Application Data

(60) Provisional application No. 62/420,323, filed on Nov. 10, 2016, provisional application No. 62/425,756, filed on Nov. 23, 2016.

(51) Int. Cl.
*H04B 7/0417* (2017.01)
*H04W 72/04* (2009.01)
(Continued)

(52) U.S. Cl.
CPC ........ *H04W 72/046* (2013.01); *H04B 7/0417* (2013.01); *H04B 7/0486* (2013.01);
(Continued)

(58) Field of Classification Search
CPC . H04W 72/046; H04B 7/0486; H04B 7/0417; H04L 5/0053; H04L 5/0057; H04L 5/0048
See application file for complete search history.

(56) References Cited

U.S. PATENT DOCUMENTS

2011/0273977 A1 11/2011 Shapira et al.
2015/0351086 A1* 12/2015 Banu ............. H04W 8/186
455/513
(Continued)

FOREIGN PATENT DOCUMENTS

CN 103733527 A 4/2014
CN 104956604 A 9/2015
(Continued)

OTHER PUBLICATIONS

CMCC, "Hybrid Beamforming for Massive MIMO," 3GPP TSG RAN WG1 #85, R1-164893, Agenda Item 7.1.6, Nanjing, China, May 23-27, 2016, 5 pages.

*Primary Examiner* — Hashim S Bhatti
(74) *Attorney, Agent, or Firm* — Slater Matsil, LLP

(57) ABSTRACT

A method for operating a transmission point includes transmitting a plurality of first directional reference signals and a plurality of second directional reference signals, the plurality of first directional reference signals sweeping different first beams in a first plane and the plurality of second directional reference signals sweeping different first beams of the first plane, and receiving from a reception point, a request for the transmission point to commence operations in the second plane and a first feedback from a reception point, the first feedback indicating at least one first beam of the first plane and at least one beam group of the second plane, where measurements of the at least one first beam and the at least one beam group of the second plane satisfy a first selection criterion.

24 Claims, 12 Drawing Sheets

(51) Int. Cl.
*H04B 7/0456* (2017.01)
*H04L 5/00* (2006.01)
*H04B 7/06* (2006.01)

(52) U.S. Cl.
CPC ......... *H04B 7/0695* (2013.01); *H04L 5/0048* (2013.01); *H04L 5/0053* (2013.01); *H04L 5/0057* (2013.01)

(56) References Cited

U.S. PATENT DOCUMENTS

| | | | |
|---|---|---|---|
| 2016/0028519 A1* | 1/2016 | Wei | H04B 7/0456 375/267 |
| 2016/0134352 A1 | 5/2016 | Stirling-Gallacher | |
| 2017/0094531 A1* | 3/2017 | Kakishima | H04B 7/0617 |
| 2017/0134083 A1* | 5/2017 | Kim | H04B 7/0456 |
| 2017/0222693 A1* | 8/2017 | Shen | H04B 7/0408 |
| 2018/0145807 A1* | 5/2018 | Nagata | H04W 76/27 |

FOREIGN PATENT DOCUMENTS

| | | |
|---|---|---|
| CN | 105264788 A | 1/2016 |
| EP | 2774278 B1 | 12/2016 |
| WO | 2013157785 A1 | 10/2013 |
| WO | 2014027824 A1 | 2/2014 |

\* cited by examiner

SYSTEM AND METHOD FOR BEAMFORMED REFERENCE SIGNALS IN THREE DIMENSIONAL MULTIPLE INPUT MULTIPLE OUTPUT COMMUNICATIONS SYSTEMS

This application claims the benefit of U.S. Provisional Applications No. 62/420,323, filed on Nov. 10, 2016, entitled "System and Method for Beamformed Reference Signals in Three Dimensional Multiple Input Multiple Output Communications Systems," and U.S. Provisional Applications No. 62/425,756, filed on Nov. 23, 2016, entitled " System and Method for Beamformed Reference Signals in Three Dimensional Multiple Input Multiple Output Communications Systems," which applications are hereby incorporated herein by reference.

TECHNICAL FIELD

The present invention relates generally to a system and method for digital communications, and, in particular embodiments, to a system and method for beamformed reference signals in three dimensional (3D) multiple input multiple output (MIMO) communications systems.

BACKGROUND

Many modern communications systems use reference signals, such as channel state information reference signals (CSI-RS), transmitted by an access node to assist User Equipment (UE) in measuring communications channels between the access node and the UE. As an illustrative example, the access node transmits a CSI-RS and a UE uses the CSI-RS to measure the communications channel and generate channel information, such as a channel quality indicator (CQI), precoding matrix index (PMI), rank indicator (RI), and the like, which it feedbacks to the access node. Access nodes may also be commonly referred to as evolved NodeBs (eNBs), base stations, NodeBs, master eNBs (MeNBs), secondary eNBs (SeNBs), remote radio heads, access points, and the like, while UEs may also be commonly referred to as mobiles, mobile stations, terminals, subscribers, users, stations, and the like. A transmission point (TP) may be used to refer to any device capable of transmitting. Therefore, transmission points may refer to access nodes, eNBs, base stations, NodeBs, MeNBs, SeNBs, remote radio heads, access points, UEs, mobiles, mobile stations, terminals, subscribers, users, and the like. A transmit-receive point (TRP) refers to a TP that also is capable of receiving.

Generally for massive Multiple Input Multiple Output (massive MIMO) or 3D MIMO communications systems, there are large numbers of transmit antennas (or ports) at the eNB. Therefore, the eNB would have to transmit a large number of CSI-RS signals in order to facilitate channel information between each transmit antenna (or ports) and each receiver antenna at each UEs. The transmission of the large number of CSI-RS would significantly impact overall communications system performance by consuming a large amount of beamformed resources as overhead.

SUMMARY

Example embodiments provide a system and method for beamformed reference signals in three dimensional (3D) multiple input multiple output (MIMO) communications systems.

In accordance with an example embodiment, a method for operating a transmission point is provided. The method includes transmitting, by the transmission point, a plurality of first directional reference signals, the plurality of first directional reference signals sweeping different first beams in a first plane which are constrained by a first beam group of a second plane, transmitting, by the transmission point, a plurality of second directional reference signals, the plurality of second directional reference signals sweeping the different first beams of the first plane which are constrained by a second beam group of the second plane, and receiving from a reception point, by the transmission point, a request for the transmission point to commence operations in the second plane and a first feedback, the first feedback indicating at least one first beam of the first plane and at least one beam group of the second plane, where measurements of reference signals in the at least one first beam and the at least one beam group of the second plane satisfy a first selection criterion. When the transmission point is capable of performing beam sweeping in the second plane, the method includes transmitting, by the transmission point, a plurality of third directional reference signals, the plurality of third directional reference signals oriented in accordance with the at least one first beam and sweeping in the at least one beam group of the second plane, and receiving, by the transmission point, a second feedback from the reception point, the second feedback indicating that at least one third directional reference signal meets a second selection criterion.

The method also includes transmitting first configuration information for the first and second directional reference signals transmitted in the first plane, the first configuration information includes at least one of a number of directional reference signals in each plane, a number of repetitions of the first and second directional reference signals in each plane, an indication of a feedback method for the reception point, a downlink transmission capability of the transmission point, a configuration of beam groups in the second plane, and a resource location for the directional reference signals. The method also includes transmitting second configuration information for the third directional reference signals transmitted in the second plane, the second configuration information includes at least one of a number of different first plane beams, a number of second plane beams for each first plane beam, a number of reference signal repetitions per second plane beam, resource locations of different reference signals, a feedback method indicator, and a maximum rank of the transmission point in the second plane.

When the second feedback includes channel quality indicators for the at least one third directional reference signal, the method also includes selecting transmission parameters in accordance with the channel quality indicators, and transmitting an indication of the transmission parameters to the reception point. The indication of the transmission parameters includes at least one of a modulation and coding scheme (MCS) level, a beam index of a directional reference signal selected in accordance with the channel quality indicators, a precoding matrix indicator (PMI), and a rank indicator (RI).

When transmission point is incapable of performing beam sweeping in the second plane, the method also includes transmitting a beamformed reference signal configuration to the reception point, the beamformed reference signal configuration including an indication that the transmission point is not capable of operations in the second plane. The method further includes transmitting data to the reception point in accordance with the first feedback.

The method also includes receiving a start data transmission request from the reception point, the start data transmission request indicating to the transmission point to commence communications with the reception point in accordance with the first feedback, and transmitting information to the reception point in accordance with the first feedback.

In accordance with an example embodiment, a method for operating a reception point is provided. The method includes receiving, by the reception point, a plurality of first directional reference signals and a plurality of second directional reference signals, the plurality of first directional reference signals sweeping different first beams in a first plane which are constrained by a first beam group of a second plane, the plurality of second directional reference signals sweeping the different first beams of the first plane which are constrained by a second beam group of the second plane, selecting, by the reception point, at least one first selected directional reference signal from at least one of the plurality of first and second directional reference signals that meets a first selection criterion, and at least one beam group associated with the at least one first selected directional reference signal, and transmitting, by the reception point, a first feedback indicating the at least one first selected directional reference signal and the at least one beam group associated with the at least one first selected directional reference signal.

The method also includes receiving, by the reception point, a plurality of third directional reference signals sweeping the at least one beam group as indicated in the first feedback, selecting, by the reception point, at least one second selected directional reference signal from the plurality of third directional reference signals that meet a second selection criterion, and transmitting, by the reception point, a second feedback indicating the at least one second selected directional reference signal. The second feedback also indicates channel quality indicators for the at least one second selected directional reference signal. The second feedback comprises beam indices corresponding to directional reference signals in a first subset of the at least one first selected directional reference signal and the at least one second selected directional reference signal. The second feedback comprises at least one of a first precoding matrix indicator for a first subset of the at least one first selected directional reference signal and a second precoding matrix indicator for the at least one second selected directional reference signal. Each one of the first selection criterion and the second selection criterion comprises one of a received signal strength, a signal to noise ratio (SNR), a signal to interference plus noise ratio (SINR), and a channel capacity.

The method also includes receiving configuration information for directional reference signals in the first and second planes, the configuration information including at least one of a number of directional reference signals in each plane, a number of repetitions of the directional reference signals in each plane, an indicator of a feedback method for the reception point, a downlink transmission capability of a transmission point, a configuration of beam groups in the second plane, and a resource location for the directional reference signals.

In accordance with an example embodiment, a transmission point is provided. The transmission point includes a processor, and a computer readable storage medium storing programming for execution by the processor. The programming including instructions to configure the transmission point to transmit a plurality of first directional reference signals, the plurality of first directional reference signals sweeping different first beams in a first plane which are constrained by a first beam group of a second plane, transmit a plurality of second directional reference signals, the plurality of second directional reference signals sweeping the different first beams of the first plane which are constrained by a second beam group of the second plane, receive, from a reception point, a request for the transmission point to commence operations in the second plane and a first feedback, the first feedback indicating at least one first beam of the first plane and at least one beam group of the second plane, where measurements of reference signals in the at least one first beam and the at least one beam group of the second plane satisfy a first selection criterion. When the transmission point is capable of performing beam sweeping in the second plane, the programming includes instructions to configure the transmission point to transmit a plurality of third directional reference signals, the plurality of third directional reference signals oriented in accordance with the at least one first beam and sweeping in the at least one beam group of the second plane, and receive a second feedback from the reception point, the second feedback indicating that at least one third directional reference signal meets a second selection criterion.

The programming includes instructions to configure the transmission point to transmit first configuration information for the first and second directional reference signals transmitted in the first plane, the first configuration information includes at least one of a number of directional reference signals in each plane, a number of repetitions of the first and second directional reference signals in each plane, an indication of a feedback method for the reception point, a downlink transmission capability of the transmission point, a configuration of beam groups in the second plane, and a resource location for the directional reference signals.

When the second feedback includes channel quality indicators for the at least one third directional reference signal, the programming includes instructions to configure the transmission point to select transmission parameters in accordance with the channel quality indicators, and transmit an indication of the transmission parameters to the reception point. The indication of the transmission parameters includes at least one of a modulation and coding scheme (MCS) level, a beam index of a directional reference signal selected in accordance with the channel quality indicators, a precoding matrix indicator (PMI), and a rank indicator (RI). The programming includes instructions to configure the transmission point to, when the transmission point is incapable of performing beam sweeping in the second plane, transmit a beamformed reference signal configuration to the reception point, the beamformed reference signal configuration including an indication that the transmission point is not capable of operations in the second plane. The programming includes instructions to configure the transmission point to receive a start data transmission request from the reception point, the start data transmission request indicating to the transmission point to commence communications with the reception point in accordance with the first feedback, and transmit information to the reception point in accordance with the first feedback.

In accordance with an example embodiment, a reception point is provided. The reception point includes a processor, and a computer readable storage medium storing programming for execution by the processor. The programming including instructions to configure the reception point to receive a plurality of first directional reference signals and a plurality of second directional reference signals, the plurality of first directional reference signals sweeping different first beams in a first plane which are constrained by a first beam group of a second plane, the plurality of second directional reference signals sweeping the different first beams of the first plane which are constrained by a second beam group of the second plane, select at least one first selected directional reference signal from at least one of the plurality of first and second directional reference signals that meets a first selection criterion, and at least one beam group associated with the at least one first selected directional reference signal, and transmit a first feedback indicating the at least one first selected directional reference signal and the at least one beam group associated with the at least one first selected directional reference signal.

The programming includes instructions to configure the reception point to receive a plurality of third directional reference signals sweeping the at least one beam group as indicated in the first feedback, select at least one second selected directional reference signal from the plurality of third directional reference signals that meet a second selection criterion, and transmit a second feedback indicating the at least one second selected directional reference signal. The programming includes instructions to configure the reception point to receive configuration information for directional reference signals in the first and second planes, the configuration information including at least one of a number of directional reference signals in each plane, a number of repetitions of the directional reference signals in each plane, an indicator of a feedback method for the reception point, a downlink transmission capability of a transmission point, a configuration of beam groups in the second plane, and a resource location for the directional reference signals.

Practice of the foregoing embodiments enables a reduction in communications overhead in communications systems with large numbers of user equipments (UEs) by reducing the complexity involved in configuring beamformed reference signals.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
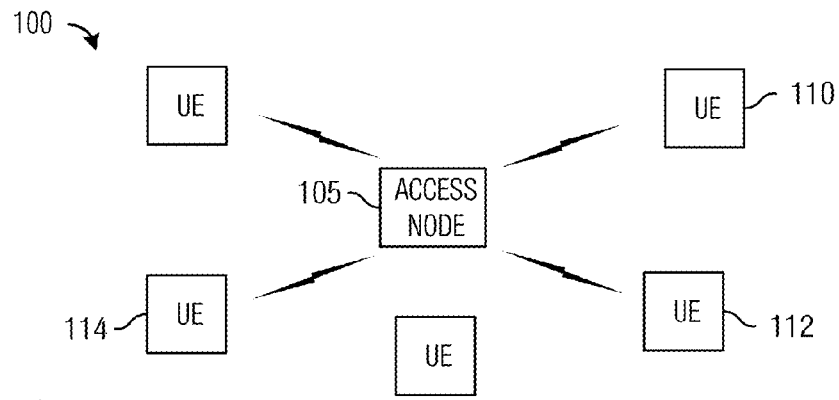
FIG. 1 illustrates an example communications.

FIG. 1 illustrates an example communications system loft Communications system 100 includes an access node 105 serving a plurality of UEs, such as UEs 110, 112, and 114. In an example operating mode, transmissions for UEs as well as transmissions by UEs pass through access node 105. Access node 105 allocates beamformed resources for the transmissions to or from the UEs.

While it is understood that communications systems may employ multiple access nodes capable of communicating with a number of UEs, only one access node, and five UEs are illustrated for simplicity.

As discussed previously, the access node transmits multiple channel state information reference signals (CSI-RS) to the UEs to enable the UEs to measure the communications channels between different access node transmission antennas (or ports) and the UEs' receiver antennas and to generate channel information, which is fedback to the access node. The process of the access node transmitting a CSI-RS is commonly referred to as sounding. When the access node has a large number of transmission antennas (or ports), such as in a massive multiple input multiple output (massive MIMO) implementation, sounding may consume a considerable amount of beamformed resources, thereby negatively impacting communications system performance. A transmission point (TP) may be considered to be a device sending a transmission, and a reception point (RP) may be considered to be a device receiving the transmission. A single device may be both a transmission point and a reception point for different transmissions; such a device is referred to as a transmit-receive point (TRP). As an illustrative example, a device may be a transmission point in a first transmission when it sends a transmission to another device, and the device may also be a reception point in a second transmission when it receives a transmission from yet another device. Examples of TRPs may include access nodes, evolved NodeBs (eNBs), base stations, NodeBs, master eNBs (MeNBs), secondary eNBs (SeNBs), remote radio heads, access points, UEs, mobiles, mobile stations, terminals, subscribers, users, and the like.

In communications systems that are link-budget limited (such as communications systems operating above 6 GHz, e.g., millimeter wave (mmWave) communications systems) the reference signals transmitted by the TRP are generally beamformed to meet performance requirements in an operating environment with high path-loss. Although the discussion presented herein focuses on beamformed CSI-RS, the example embodiments presented herein are not limited to CSI-RS and are applicable to other reference signals, including but not limited to beam reference signals (BRS), beam refinement reference signals (BRRS), beamformed cell-specific reference signals (CRS), and so on. Therefore, the focus on CSI-RS should not be construed as being limiting to either the scope or the spirit of the example embodiments presented herein.

When beamformed reference signals are sounded in multiple directions (such as the elevation and the azimuth directions), as would be the case in a three-dimensional MIMO (3D MIMO) communications system operating at 6 GHz and above, the communications overhead may significantly impact overall communications system performance. As an illustrative example, consider a communication system that includes TRPs serving 120 degree sectors in the azimuth direction and +/−37.5 degrees in the elevation direction. If the beamformed reference signals have a 12.5 degree half-power bandwidth each, then 9 beams are needed in the azimuth direction (9×12.5=120) and 6 beams are needed in the elevation direction (6×12.5=75), which means that there will be 9×6=54 beamformed CSI-RS symbols.

Beamforming in the elevation direction has been studied to support: 1) users located at different distances (therefore different elevation angles) from the TRP that can be co-scheduled, even if they have the same or similar azimuth angles; 2) to reduce interference to adjacent cells that are served by neighboring TRPs; and 3) serving and co-scheduling UEs that are located in different floors of high rise buildings (even higher than the TRP).

In a communications system that is operating at frequencies greater than 6 GHz, propagation conditions, cell sizes, and outdoor to indoor propagation losses (O2I) are very different from communications systems that are operating at frequencies below 6 GHz. Therefore, motivations for including elevation beamforming could include improved robustness against blocking, increased overall beamforming gain, the ability to increase the numbers of co-scheduled UEs, and serving and co-scheduling UEs located on different elevations of an indoor structure (such as in an indoor hot spot (InH) scenario).

In co-assigned U.S. patent application entitled "System and Method for Beam-Formed Channel State Reference Signals," filed Oct. 9, 2015, Publication Number US 2016/0134352A1, which is hereby incorporated herein by reference, techniques for reducing sounding overhead of beamformed CSI reference symbols for massive MIMO and/or 3D MIMO are provided. The techniques utilize different planes, such as azimuth and/or elevation. Because the different planes are consecutively sounded (as opposed to being individually sounded such as in prior art implementations of non-beam-formed CSI-RS) there is no ambiguity about the final rank. Furthermore, because the configuration of a second plane may be transmitted after feedback corresponding to a first plane has been received, the second plane beamforming may adapt its second plane configuration and sounding codebook, depending upon a chosen feedback direction from the first plane (thereby accommodating non-linear two-dimensional (2D) codebooks).

Although the techniques presented in the co-assigned U.S. patent application US 2016/01343521 decrease the overhead and the corresponding number of beamformed CSI-RS resources that the TRP always has to sound, the total number of beamformed CSI-RS resources increases with the number of UEs and the rank for each of the UEs, especially in situations when the UEs are distributed in the first plane and each UE selects different first plane directions. As an illustrative example, referring back to the above referenced example communications system with TRPs serving 120 degree sectors in the azimuth direction and +/−37.5 degrees in the elevation direction, the total number of beamformed CSI-RS resources needed is equal to $$\text{CSI-RS resources} = \text{TRP specific CSI-RS resources} + \Sigma \text{ UE specific CSI-RS resources} = 9 + \Sigma_{i=1}^{total\_users} \text{Rank\_UE}_i,$$

where $\text{Rank\_UE}_i$ is the rank of the i-th UE.

Figure 2:
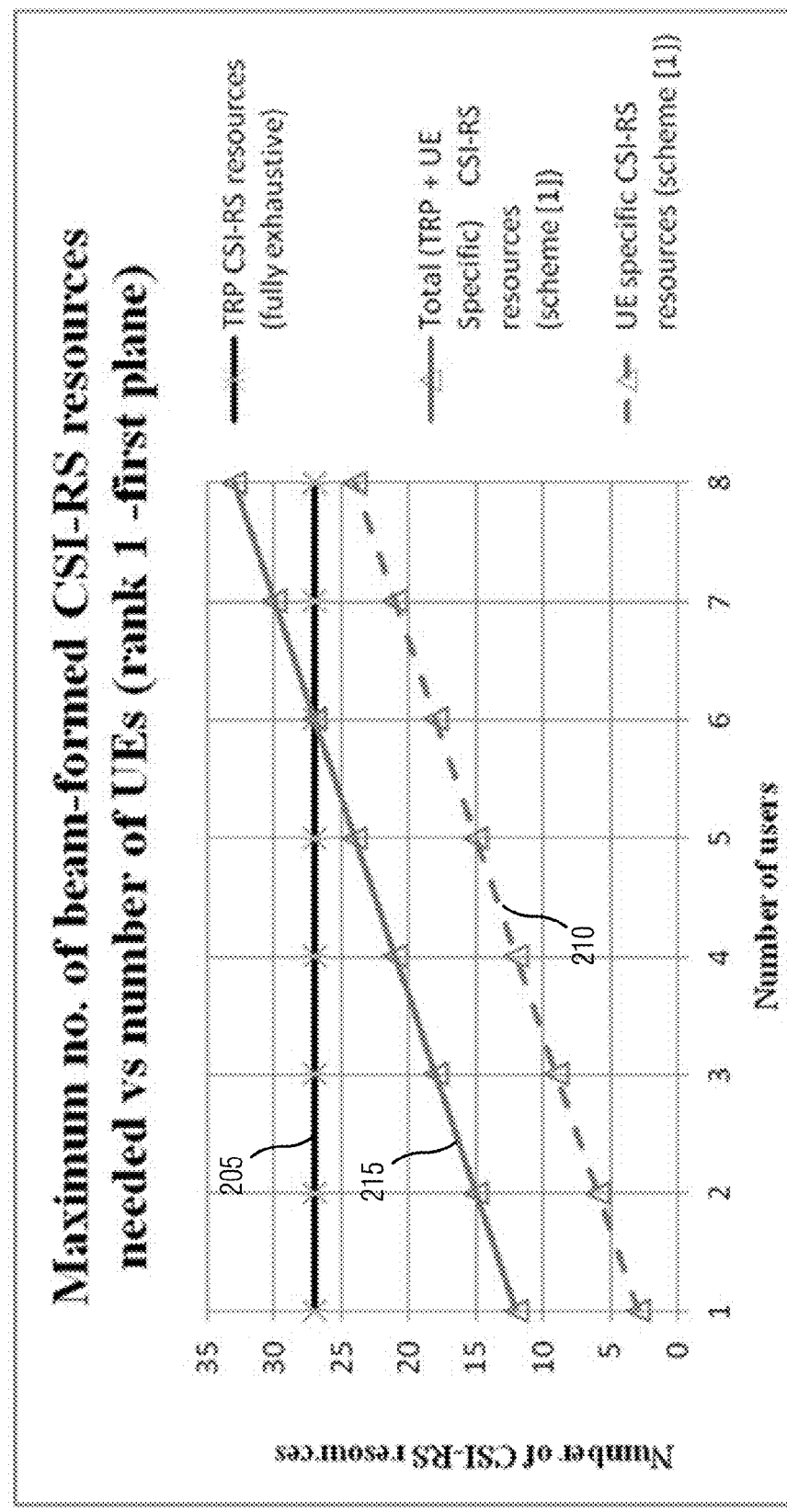
FIG. 2 illustrates a first plot of beamformed CSI-RS resources as a function of number of UEs.

FIG. 2 illustrates a first plot 200 of beamformed CSI-RS resources as a function of number of UEs. The data displayed in first plot 200 correspond to a communications system with 7 azimuth beams and 3 elevation beams. A first trace 205 of first plot 200 represents TRP beamformed CSI-RS resources needed in a fully exhaustive sounding technique, a second trace 210 represents UE specific beamformed CSI-RS resources (assuming each UE selects a different resources in the first step) and a third trace 215 represents total (UE specific and TRP) beamformed CSI-RS resources according to the techniques and example parameters presented in the co-assigned U.S. patent application US 2016/0134352A1. The number of resources increases as the number of UEs increases (based on the assumption that each UE selects a different resource in the first step). It is noted that the rate of sounding TRP specific beamformed CSI-RS symbols in a first direction and the UE specific beamformed CSI-RS symbols in a second direction may differ, so the actual number of beamformed CSI-RS symbols may vary depending on implementation.

According to an example embodiment, multi-stage techniques for reduced sounding overhead of beamformed reference signals for massive MIMO and/or 3D MIMO systems with large numbers of UEs are provided. The reduction in overall sounding overhead for large numbers of UEs is achieved by grouping the beams in one of the planes into a plurality of beam groups, which enables a reduction in the sounding of UE specific beamformed reference signals once feedback is received from the UEs. The sounding of the UE specific beamformed reference signals is performed at the beam group granularity rather than all of the beams of one of the planes. Therefore, it is possible to eliminate a subset of the beams of one of the planes when performing UE specific beamformed reference signals sounding and reduce the overall sounding overhead.

As an illustrative example, in a first stage, TRP specific beamformed reference signals are sounded by sweeping along a first plane using wide beams that span a first beam group in a second plane, followed by sweeping along the first plane using wide beams that span a second beam group in the second plane. The sweeping along the first plane continues until the TRP specific beamformed reference signals are sounded in all beam directions of both planes. The UEs measure the beamformed reference signals transmitted by the TRP and provide feedback. For each UE, the feedback includes indications of which direction(s) (which correspond to beams) in the first plane and which beam group(s) resulted in the best measurement. The UE may determine the direction(s) and beam group(s) based on measurements with best reference signal received power (RSRP), best reference signal received quality (RSRQ), strongest received signal, and so on.

In some situations, more than one direction or beam groups may be reported by the UE. As an example, the UE may be located in between two beams of the first plane or two beam groups in the second plane, a beam oriented more directly towards the UE may be partially blocked while a beam oriented not as directly towards the UE may be unblocked, a beam oriented more directly towards the UE may have higher path-loss than a beam oriented not as directly towards the UE, and so on.

Figure 3A:
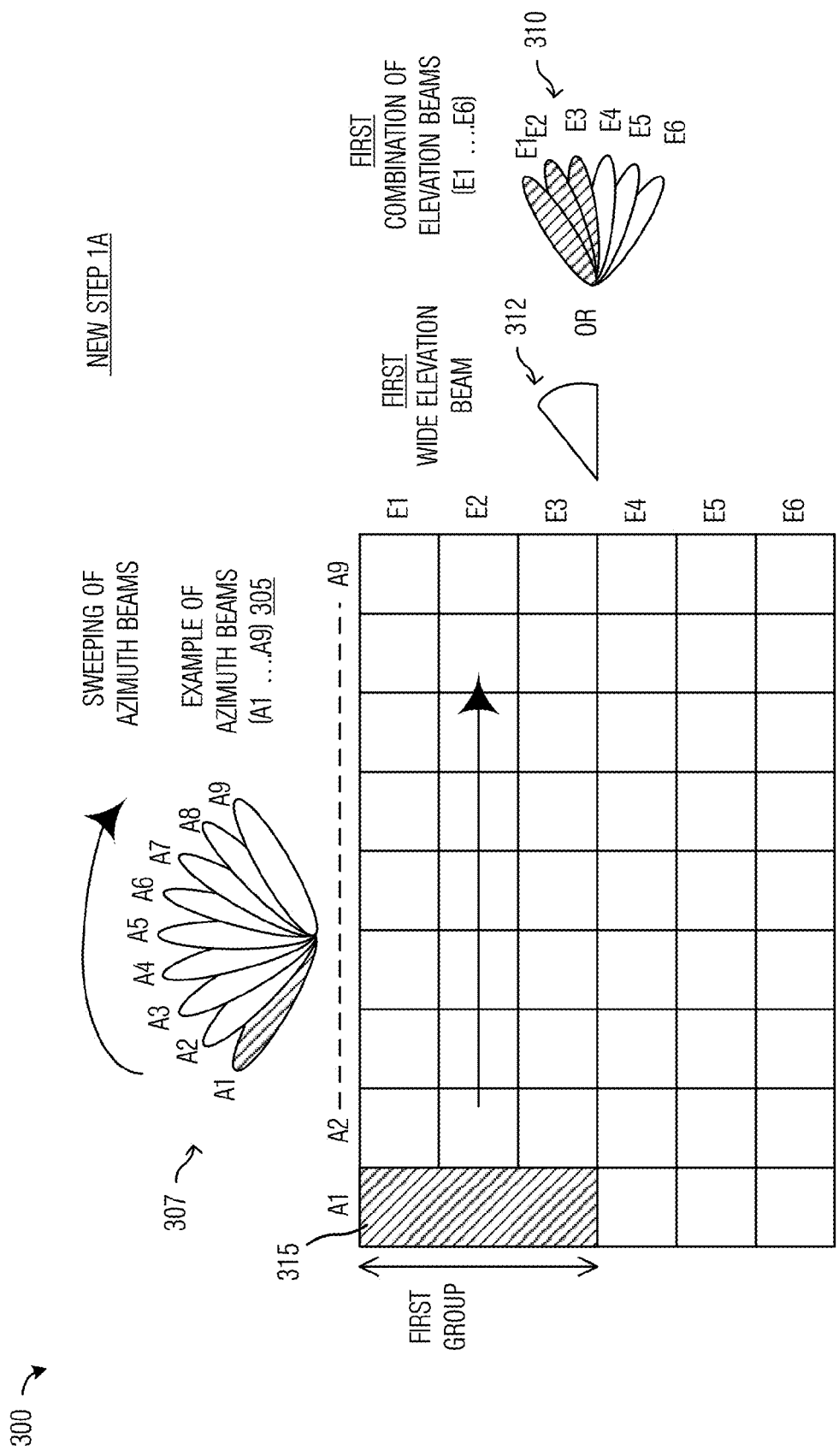
FIGS. 3A through 3D illustrate diagrams of beamformed resources highlighting an example embodiment for the sounding of beamformed reference signals according to example embodiments described herein.

FIGS. 3A through 3D illustrate diagrams of beamformed resources highlighting an example embodiment for the sounding of beamformed reference signals. FIG. 3A illustrates a diagram 300 of a first part of a first stage of an example embodiment in the sounding of beamformed reference signals. In the first part of the first stage, a TRP sounds TRP specific beamformed reference signals on beams along a first plane, e.g., beams along an azimuth plane 305. In each beam (e.g., beam A1 307) of azimuth plane 305, the TRP sounds beamformed reference signals using either beams belonging to a first beam group of a second plane, e.g., individual beams 310 along an elevation plane that are members of a first beam group (shown as the diagonally cross-hatched beams E1, E1, and E3), or a wide beam 312 that encompasses the beams of the first beam group of the second plane. In other words, the beams sounded in the first plane are constrained by the first beam group of the second plane. As shown in FIG. 3A, the sounding of the beamformed reference signals over individual beams 310 or wide beam 312 is shown in highlight 315. The TRP sounds the beamformed reference signals on all of the beams of the azimuth plane 305.

Figure 3B:
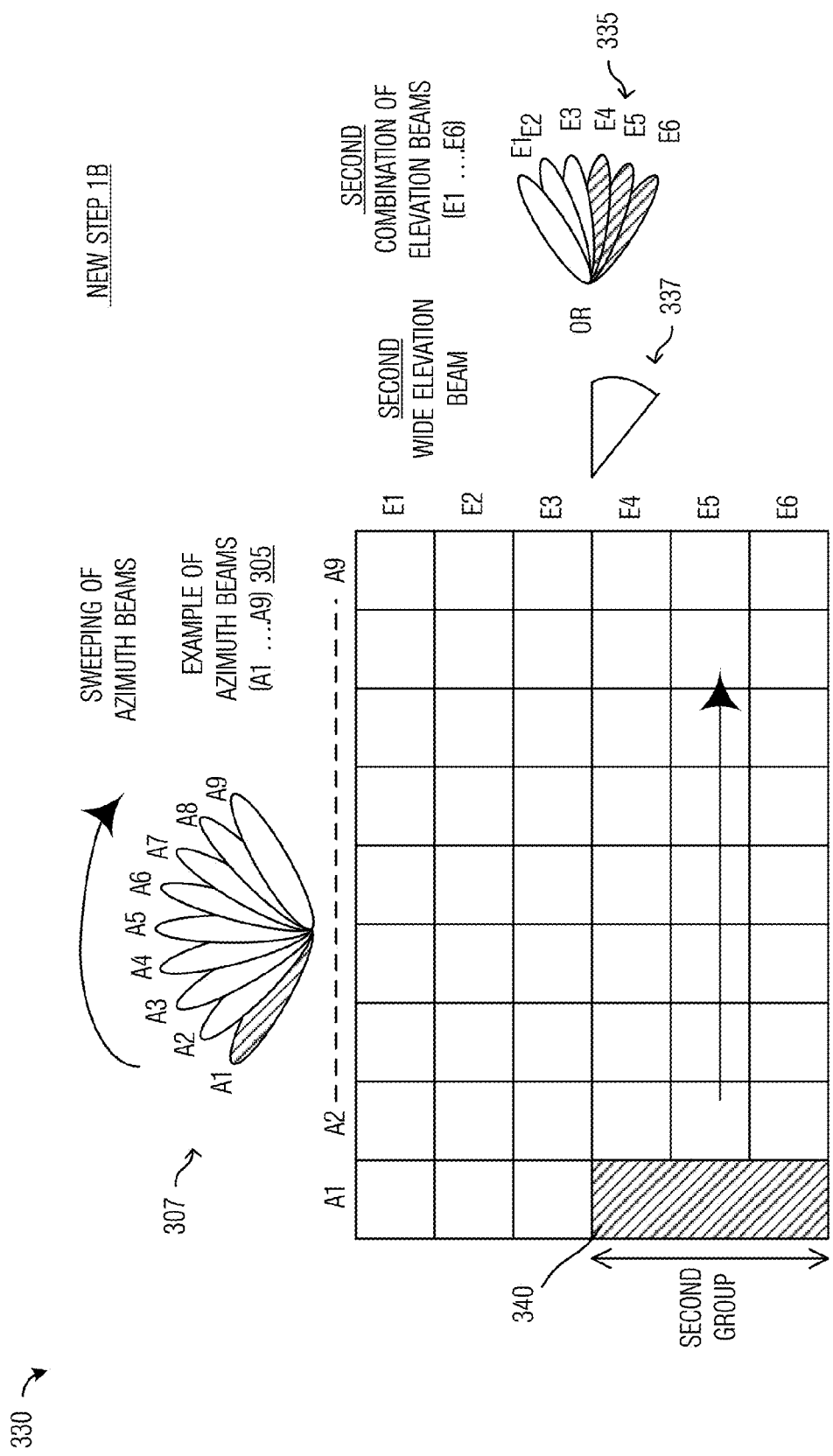

FIG. 3B illustrates a diagram 330 of a second part of the first stage of the example embodiment in the sounding of beamformed reference signals. In the second part of the first stage, the TRP sounds TRP specific beamformed reference signals on beams along the first plane, e.g., beams along azimuth plane 305. In each beam (e.g., beam A1 307) of azimuth plane 305, the TRP sounds beamformed reference signals using either beams belonging to a second beam group of the second plane, e.g., individual beams 335 along the elevation plane that are members of a second beam group (shown as the diagonally cross-hatched beams E4, E5, and E6), or a wide beam 337 that encompasses the beams of the second beam group of the second plane. In other words, the beams sounded in the first plane are constrained by the second beam group of the second plane. As shown in FIG. 3B, the sounding of the beamformed reference signals over individual beams 335 or wide beam 337 is shown in highlight 340. The TRP sounds the beamformed reference signals on all of the beams of the azimuth plane 305.

If the beams of the second plane are grouped into more than 2 beam groups, the TRP continues sounding beamformed reference signals in each of the beam groups until the TRP has sounded beamformed reference signals in all beam groups. In other words, the first stage comprises the TRP sequentially sounding beamformed reference signals in each beam group in the second plane. The UEs provide feedback to the TRP, the feedback may include azimuth beam(s) information and elevation group(s) information for azimuth beam(s) and beam group(s) associated with the best measurements of the beamformed reference signals. The azimuth beam(s) and beam group(s) may be based on measurements made by the UEs, such as RSRP, RSRQ, received signal strength, and so on, measurements.

Figure 3C:
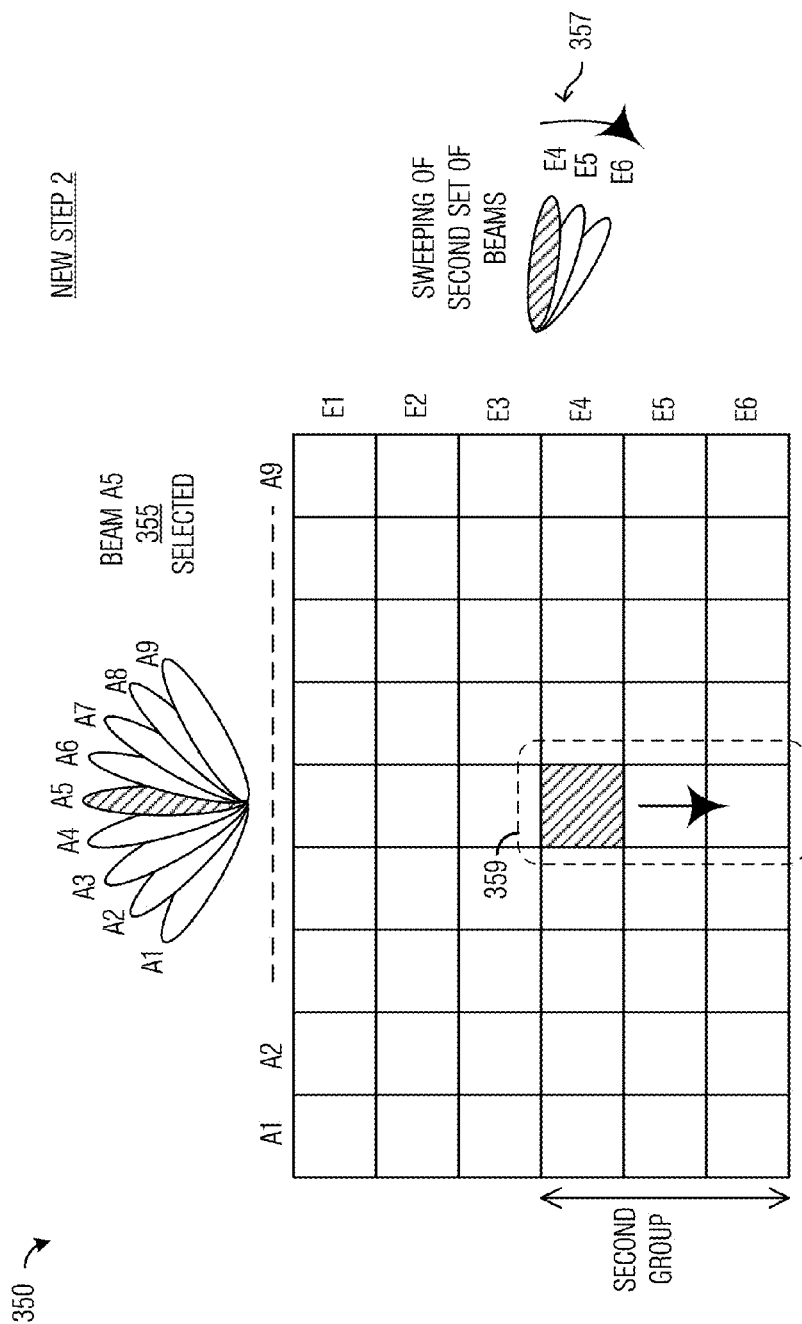

After receiving the feedback from the UEs, the TRP enters a second stage of the example embodiment in the sounding of beamformed reference signals, namely, the sweeping of UE specific beamformed reference signals for the individual UEs in the beam groups provided in the feedback from the UEs. FIG. 3C illustrates a diagram 350 of a second stage of the example embodiment in the sounding of beamformed reference signals. In the second stage, the TRP sounds UE specific beamformed reference signals in beam groups in the second plane and azimuth beam(s) as indicated in the feedback received from individual UEs. As shown in FIG. 3C, the TRP is sweeping UE specific beamformed reference signals to a UE or a group of UEs using individual beams of the second beam group (comprising beams E4, E5, and E6) 357 in azimuth beam A5 355, as indicated in the feedback received from the UE or group of UEs. In FIG. 3C, the sounding of the beamformed reference signals is shown in highlight 359.

After the TRP sounds the UE specific beamformed reference signals in accordance with the feedback received from the UEs, the UEs provide additional feedback to the TRP. The additional feedback provided by the UEs include information for specific beams along the second plane (out of the beams in the beam group(s) swept by the TRP) that are selected by the UE based on measurements of the UE specific beamformed reference signals sounded by the UE. As an example, the UE selects best beam(s) along the second plane based on measurements made by the UEs, such as RSRP, RSRQ, received signal strength, and so on, measurements of the UE specific beamformed reference signals.

Figure 3D:
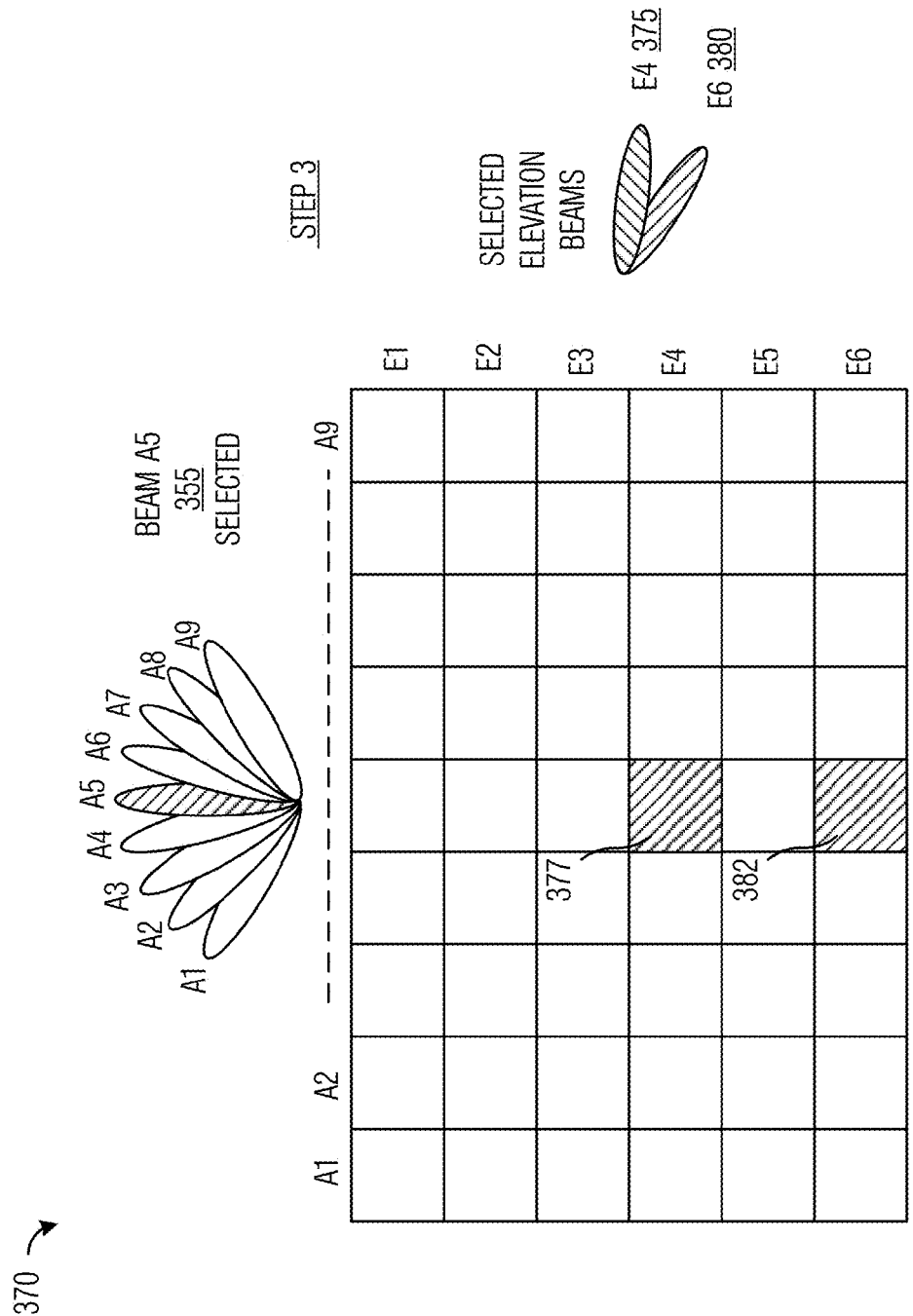

FIG. 3D illustrates a diagram 370 of a third stage of the example embodiment in the sounding of beamformed reference signals. In the third stage, the TRP communicates to the UEs using the beam(s) along the first plane and the beam(s) along the second plane as indicated by the UEs. As shown in FIG. 3D, the TRP is communicating with a UE using azimuth beam A5 355 and elevation beams E4 375 and E6 380 as indicated by the UE. The communications is shown in highlights 377 and 382, respectively.

Figure 4A:
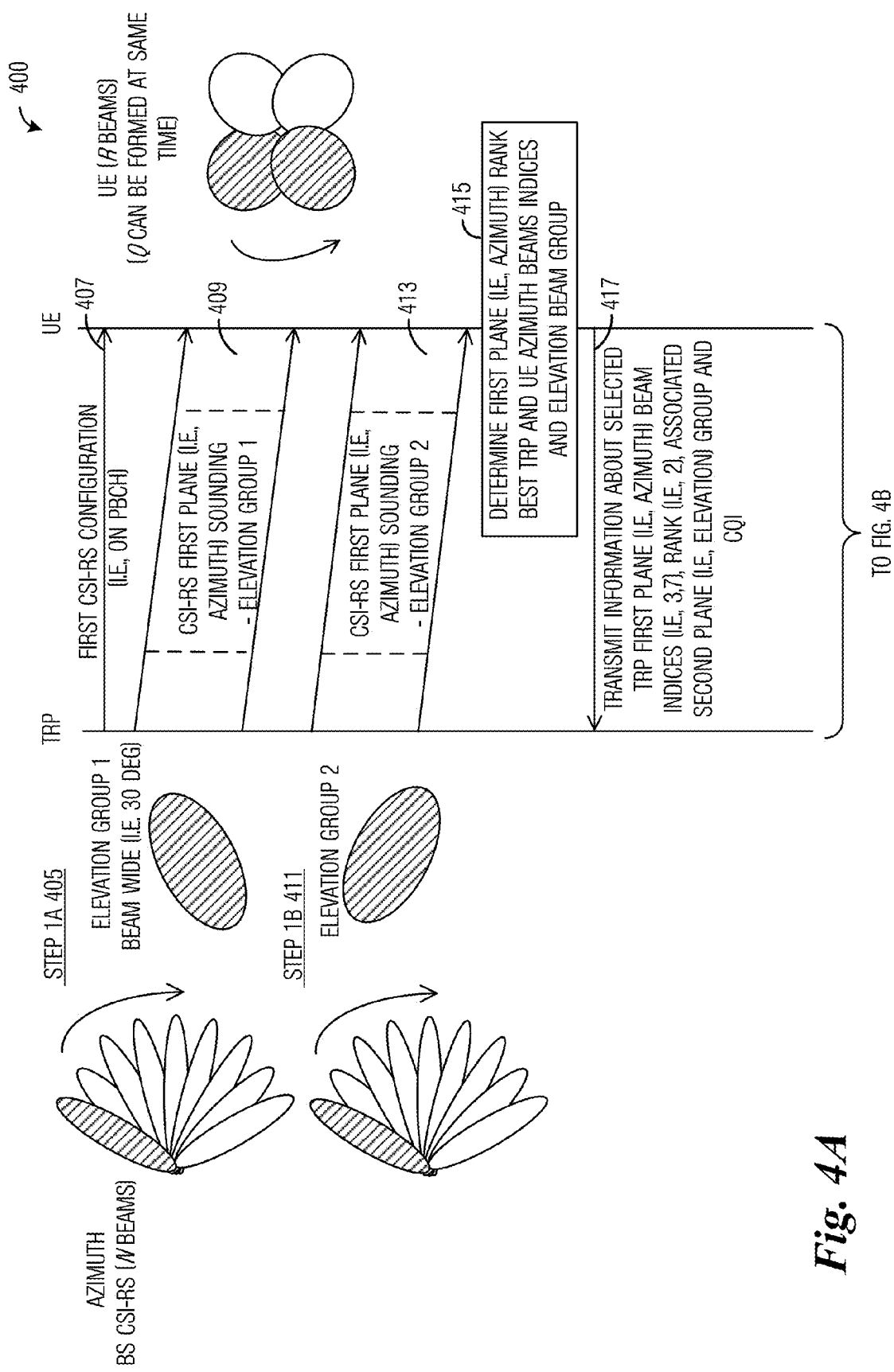
FIGS. 4A and 4B illustrate a diagram highlighting communications exchanged and processing performed by a TRP and a UE participating in an example multi-stage technique for reduced sounding overhead of beamformed reference signals for massive MIMO and/or 3D MIMO systems according to example embodiments described herein.
Figure 4B:
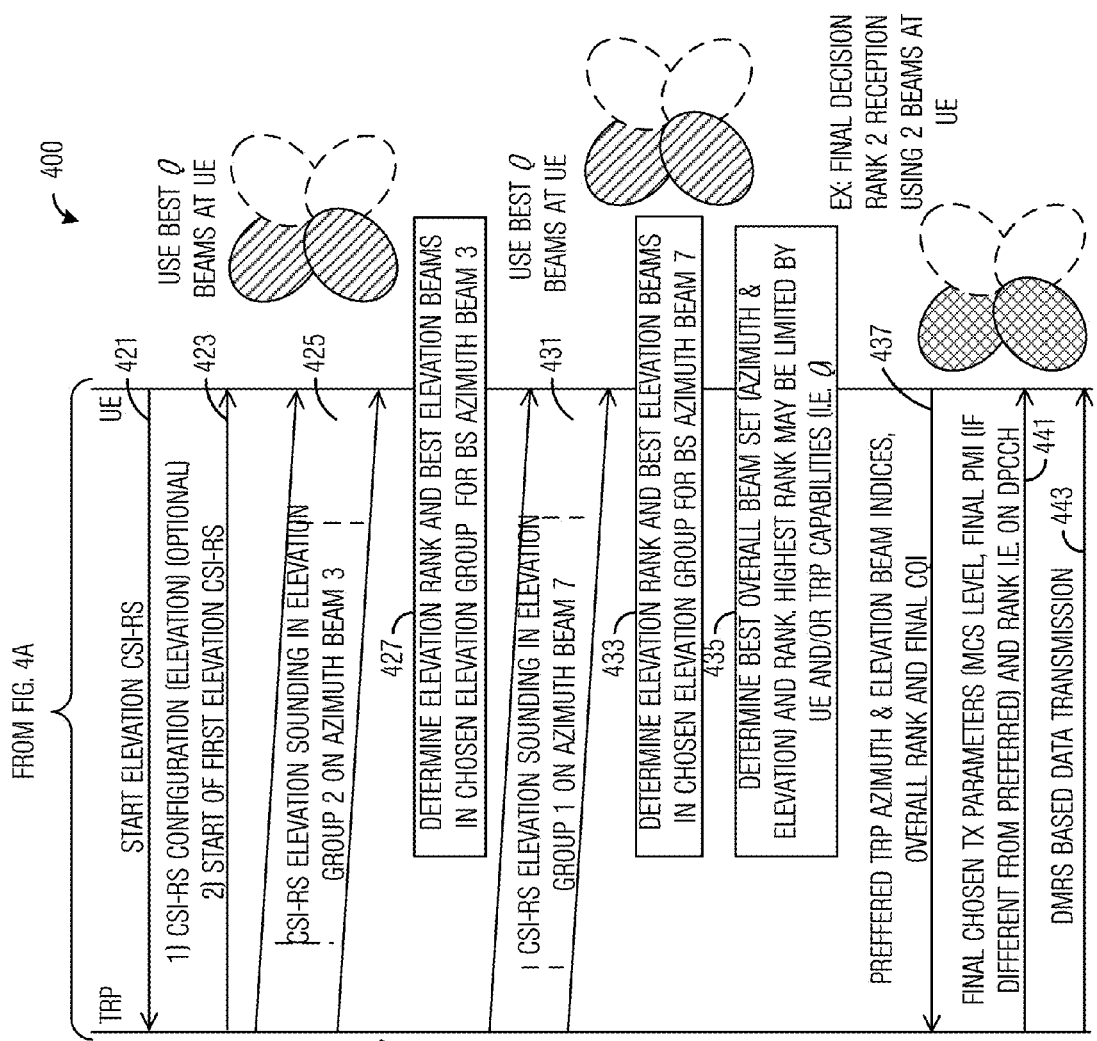
Figure 4B:
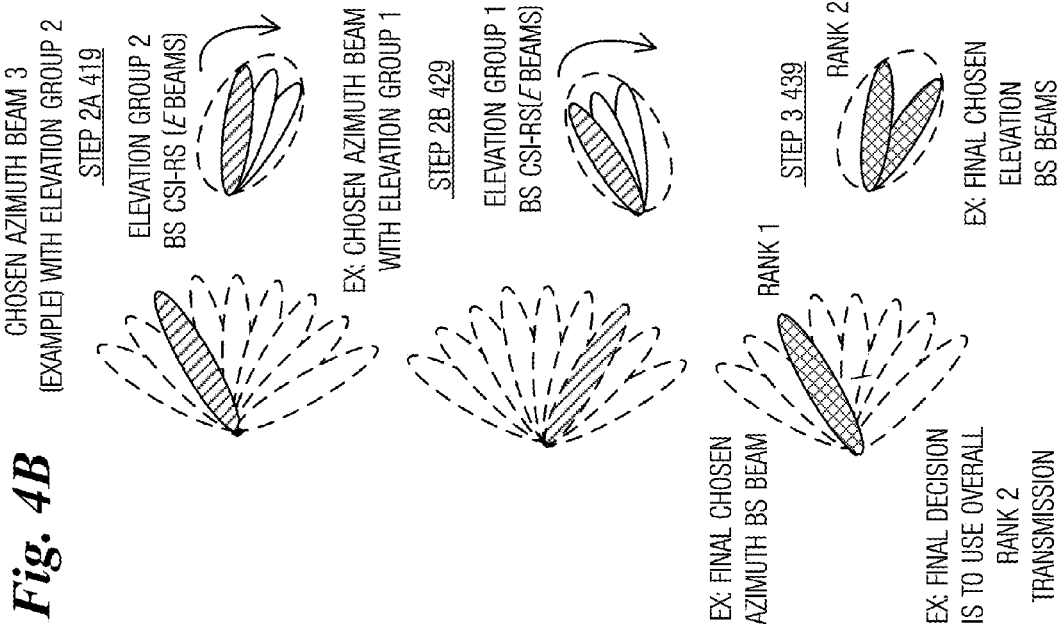

FIGS. 4A and 4B illustrate a diagram 400 highlighting communications exchanged and processing performed by a TRP and a UE participating in an example multi-stage technique for reduced sounding overhead of beamformed reference signals for massive MIMO and/or 3D MIMO systems. Diagram 400 highlights communications exchanged and processing performed by a TRP and a UE as the devices participate in a multi-stage technique for reducing sounding overhead of beamformed reference signals for massive MIMO and/or 3D MIMO systems, where beams oriented in a second plane are grouped into a plurality of beam groups, enabling the sounding of UE specific beamformed reference signals in specific beam groups (based on feedback from the UEs) instead of all of beams of the second plane.

The multi-stage technique begins with a first step of a first stage 405, where beamforming in a first plane (e.g., the azimuth plane) with beams of a first beam group of a second plane (e.g., the elevation plane) is performed. The beams sounded in the first plane are constrained by the first beam group of the second plane. As an illustrative example, the TRP transmits a first CSI-RS configuration (event 407), as well as a plurality of beamformed reference signals in the first plane (where individual beamformed reference signals are transmitted with different angles, orientation, and the like) in accordance with the first beam group (event 409).

The first CSI-RS configuration may include:
A number of reference signals in the first plane;
A number of reference signal repetitions per beam (to accommodate less capable UEs);
A maximum rank of the TRP (in the first plane);
Time/frequency/code resource location(s) of different reference signals;
UE feedback method configuration;
A number of the beam groups across the second plane; and
An order or mapping of the reference signals (spanning the first plane and the beam groups across the second plane) to the resource location(s);
  for time division multiplexing (TDM) of the CSI-RS (may be a one bit-length indicator),
    0=sweeping across the first plane for a fixed beam group (of the second plane) followed by changing the beam group (of the second plane) and then repeating the sweeping across the first plane, and
    1=sweeping across the beam groups (of the second plane) for each first plane beam followed by changing the first plane beam and repeating the sweeping;
  for code division multiplexing (CDM), different beam groups planes may be mapped to different code groups; and
  for frequency division multiplexing (FDM), different beam groups may be mapped to different frequency bands.

The plurality of beamformed reference signals are transmitted in the second plane using widebeams that correspond to the first beam group or a set of individual beams that belong to the first beam group. An illustration of beamformed resource utilization according to an example first step of the first stage 405 is shown in FIG. 3A. At the UE, the plurality of beamformed reference signals transmitted in the first plane in accordance with the first beam group is received. In a second step of the first stage 411, beamforming in the first plane is performed with beams of a second beam group of the second plane (event 413). For example, the TRP transmits a plurality of beamformed reference signals in the first plane in accordance with the second beam group. The beams sounded in the first plane are constrained by the second beam group of the second plane. An illustration of beamformed resource utilization according to an example second step of the first stage 411 is shown in FIG. 3B. In situations where the beams of the second plane are grouped into more than 2 beam groups, additional steps of the first stage are performed to allow for the beamforming in the first plane with beams of a third beam group (as well as fourth, fifth, sixth, and so forth, beam groups as necessary).

Depending on the type of beamforming being performed (e.g., analog radio frequency (RF) beamforming, digital beamforming, or hybrid (a combination of analog RF and digital) beamforming), different beamformed reference signals may be TDM/FDM/CDM. However, in addition to typical configuration information as provided in event 407, for example, the UE needs to be informed about how to distinguish the beams in the different planes because the UE has to feedback its choice of first plane beam(s), the associated first plane rank, and associated second plane beam group(s).

At the UE, the plurality of beamformed reference signals transmitted in the first plane in accordance with the second beam group is received. The UE determines, i.e., selects, at least one of the beamformed reference signals that meet a first selection criterion (event 415). The determination of the at least one beamformed reference signals corresponds to at least one beam of the first plane and at least one beam group in the section plane. Examples of the first selection criterion may include received signal strength, signal to noise ratio (SNR), signal plus interference to noise ratio (SINR), channel capacity, and the like. The UE feeds back information regarding the at least one beamformed reference signal meeting the first selection criterion (event 417). The information feedback by the UE is referred to as first feedback information.

The first feedback information may include:
Selected rank of the first plane;
Index (indices) of the selected beam(s) of the first plane or precoding matrix indicators (PMI) thereof, with indices or indicators of selected second plane beam group(s),
A number of selected second plane beam group(s) for the selected beam(s) index (This number may be configurable (by the TRP, for example) and ranges between 1 and a maximum number of second plane beam groups). By allowing an increase in the number of feedback second plane beam groups, (the reporting of more than one second plane beam group) enables increased flexibility. The minimum level of CQI for reporting additional second plane beam groups may be configured by the TRP; and
CQI (or any other signal strength measurement, such as RSRP, RSRQ, received signal strength indication (RSSI), SNR, SINR, and so on) of selected beam(s) of the first plane and the associated selected second plane beam group.

Overall overhead is a function of the number of reference signals in the first plane, the number of second plane beam groups, the number of fedback second plane beam groups, and the parameter indicating the number of fedback second plane beam groups.

In the first stage of the multi-stage technique, along with related steps, the beamformed reference signals may be sector and/or TRP specific. Alternatively, the beamformed reference signals may be UE specific (due to previously available control or data communications between the TRP and the UE or if the UE is part of a multi-stage tracking process, for example).

In a second stage of the multi-stage technique, beamforming in the second plane is performed. The UE informs the TRP to start beamforming in the second plane (event 421). The TRP transmits to the UE second CSI-RS configuration information for the second plane (optional, event 423), as well as a plurality of beamformed reference signals in the at least one beam group of the second plane oriented in accordance with the at least one beam of the first plane.

The second CSI-RS configuration may include:
A number of different first plane beams, which may be different from the rank of the first plane fedback by the UE;
A number of different second plane beams for each different first plane beam, the number of different second plane beams may be different for each of the selected first plane beams (additionally, each may have a different number of second plane beam groups);

A number of reference signal repetitions per beam to accommodate less capable UEs;

Time/frequency/code resource location(s) of the different reference signals;

A feedback method indicator; and

A maximum rank of the TRP in the second plane.

For each UE that provides feedback information, the TRP transmits a plurality of beamformed reference signals using individual beams of the at least one chosen beam group along each of the at least one beam of the first plane (event 425). In other words, the TRP transmits to the UE beamformed reference signals oriented in accordance with the at least one beam of the first beam using beams of the at least one beam group. As shown in FIG. 4B, in a first step of the second stage 419, the TRP transmits beamformed reference signals to a UE in accordance with a first plane beam (e.g., azimuth beam 3) using beams of beam group (e.g., beam group 2) in event 425. The UE selects at least one of the beamformed reference signals that meet a second selection criterion (block 427). Examples of the second selection criterion may include received signal strength, SNR, SINR or channel capacity and the like. Similarly, in a second step of the second stage 429, in a situation where the UE reported more than 1 first plane beam, the TRP transmits beamformed reference signals to the UE oriented in accordance with another first plane beam (e.g., azimuth beam 1) using beams of another beam group (e.g., beam group 1) in event 431. The UE selects at least one of the beamformed reference signals that meet a second selection criterion (block 433). FIGS. 4A and 4B only show the process for one UE. In the case of multiple UEs, additional independent steps for each additional UE may occur in parallel or in series with respect to the steps shown here. Sounding overhead is reduced because only the beams of the beam group(s) as indicated by the UEs are used to beamform the reference signals, thereby potentially reducing the number of beamformed reference signals per UE.

The UE determine a best overall beam set (both first and second plane beams), as well as rank (block 435). The determination of the best overall beam set is made from the at least one of the beamformed reference signals that meet the second selection criterion from block 427 and the at least one of the beamformed reference signals that meet the second selection criterion from block 433, as well as other steps of the second stage if additional first plane beams and beam groups were selected and reported by the UE in event 417. The determination of the best overall beam set may be made using the second selection criterion, for example. The UE then feeds back index(es) and parameters (e.g., CQI and rank) corresponding to the best overall set in both the first plane and the second plane (event 437). The feedback index(es) and parameters are referred to as second feedback information.

The second feedback information may include:

Selected best beam indices or PMI;

CQI or other signal strength measurement (e.g., RSRP, RSRQ, RSSI, SNR, SINR, and so on) of the selected beams; and Selected final rank.

In a third stage 439, the TRP selects transmission parameters, such as MCS level, beams selected in accordance with the second feedback information, PMI, rank, and so on, and transmits the transmission parameters to the UE (event 441). The TRP transmits a demodulation reference symbols (DMRS) based data transmission to the UE (event 443). It may be possible to reverse the order (i.e., performing beamforming in the second plane first, followed by beamforming in the first plane) in some situations, such as in high-rise building deployments, for example.

If a different PMI or beam index was used at the TRP instead of the one requested by the UE, the transmission occurring in event 443 may signal the final selected PMI or beam indices, modulation and coding scheme (MCS) level, and rank indication (RI) to the UE to permit the UE to adjust its receive beams. It is noted that the transmission occurring in event 443 has to be DMRS based because the UE does not have the channel estimation without beamforming. Channel estimation may be performed by the UE if the UE knows the TDM/FDM/CDM of the DMRS sequence of each of the allocated streams.

As shown in FIGS. 4A and 4B and in the associated discussion, only one level of feedback for each of the planes is presented. However, each plane may have multiple refinement steps in the respective planes (for the purpose of beam refinement or tracking at the TRP and/or the UE, for example). Therefore, the example embodiments are not limited to two stages, but at least one stage per plane, with the first plane using beam groups of the second plane.

According to an example embodiment, the sounding (or sweeping) of the beamformed reference signals, such as beamformed CSI-RS, in the planes may be periodic or aperiodic in nature. However, because the sweeping in the second plane only occurs after the UE provides feedback, the sweeping in the second plane is not periodic if the sounding or sweeping in the first plane was aperiodically scheduled. Possible scheduling combinations include:

Periodic beamformed reference signals in the first plane and aperiodic or periodic beamformed reference signals in the second plane; or Aperiodic beamformed reference signals in the first plane and aperiodic beamformed reference signals in the second plane.

The sweeping in the second plane may operate at a different rate from the sweeping in the first plane, even if both are scheduled in an aperiodic manner. The trigger for aperiodic sweeping for the different planes may differ and may come from the UE or TRP, for example. With regard to aperiodic sweeping in the second plane, the triggering may be initiated by the UE (such as with start elevation CSI-RS signaling in event 421 of FIG. 4B) or by the TRP.

Figure 5A:
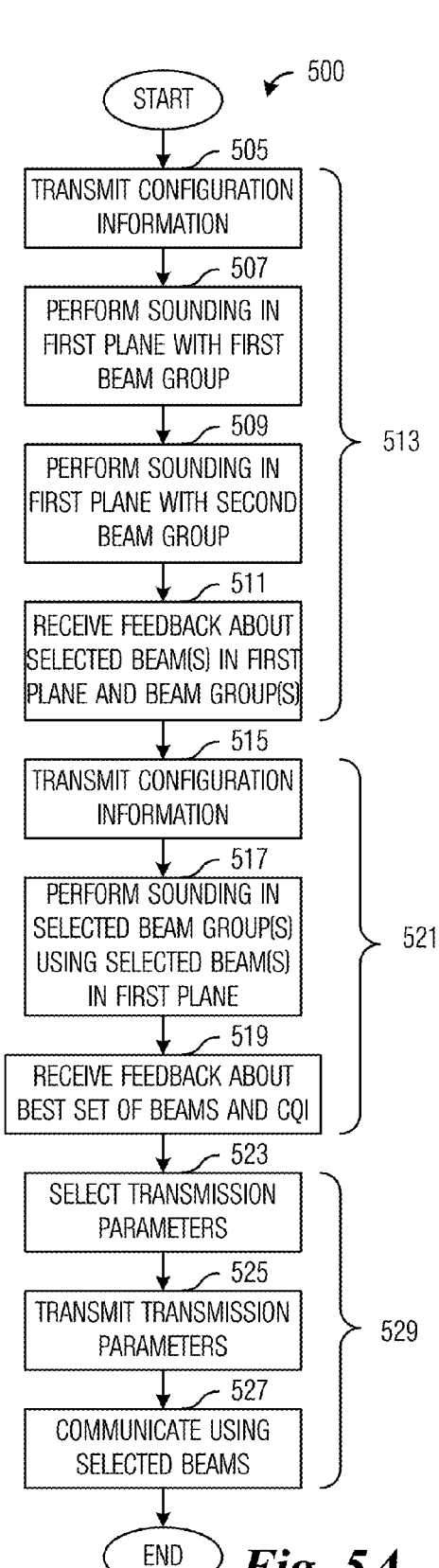
FIG. 5A illustrates a flow diagram of example operations occurring in a TRP setting up and communicating using beamformed reference signals according to example embodiments described herein.

FIG. 5A illustrates a flow diagram of example operations 500 occurring in a TRP setting up and communicating using beamformed reference signals. Operations 500 may be indicative of operations occurring in a TRP as the TRP sets up and communicates using beamformed reference signals.

Operations 500 begin with the TRP transmitting first configuration information for a first plane (block 505). The first configuration information may include reference signal configuration on a control channel, such as a broadcast control channel (BCCH) or physical broadcast control channel (PBCH). The first configuration information may include information about beams in the first plane, as well as beam group configuration in the second plane. The TRP performs beamformed reference signal sounding in the first plane in accordance with a first beam group (block 507) and a second beam group (block 509). In other words, the beams sounded in the first plane are constrained by the first and second beam groups of the second plane. It is noted that if there are more than 2 beam groups, the TRP also performs beamformed reference signal sounding in the first plane in accordance with the additional beam groups. The TRP receives first feedback about selected beam(s) in the first plane and selected beam group(s) in the second plane (block 511). Collectively, blocks 505, 507, 509, and 511 may be referred to as a first stage of a multi-stage technique for reduced sounding overhead of beamformed reference signals for massive MIMO and/or 3D MIMO systems (blocks 513).

The TRP transmits second configuration information for the second plane (block 515). The second configuration information may include reference signal (such as CSI-RS) configuration on a control channel that may be a UE specific or a grouped UE specific control channel. The first and second configuration information may be transmitted separately as shown in FIG. 5A (blocks 505 and 515) or they may be transmitted together (i.e., a merging of blocks 505 and 515) and taking place at the beginning of the first stage of the multi-stage technique. The second configuration information may also include information about beam groups. The reference signal configuration may be related to the CSI-RS on the second plane, such as the elevation plane, for example. The reference signal configuration may be UE specific or specific to a group of UEs. The TRP performs sounding in beam group(s) of the second plane using selected beam(s) in the first plane as fedback by the UE (block 517). The use of the selected beam(s) in the first plane as indicated by the UE helps to reduce the number of beamformed reference signals sounded by the TRP, thereby reducing the configuration time and complexity. Individual beamformed reference signals are transmitted with different angles, orientations, and the like, according to beams of the selected beam group(s). The TRP receives second feedback information about a best set of beams (block 519). The second feedback information includes information about a best set of beams out of the beams sounded by the TRP in both the first plane and the beam group(s) of the second plane. The second feedback information includes information about one or more beams in the first plane that meets the first selection criterion and one or more beams in the beam group(s) of the second plane that meets the second selection criterion at the UE. The second feedback information may comprise indices of the one or more beams in the best set of beams. The second feedback information may also include CQI for the one or more beams or for the overall channel and rank information. Collectively, blocks 515, 517, and 519 may be referred to as a second stage of a multi-stage technique for reduced sounding overhead of beamformed reference signals for massive MIMO and/or 3D MIMO systems (blocks 521).

The TRP selects transmission parameters (block 523). The transmission parameters may include MCS level, beams selected in accordance to the received second feedback information, PMI, rank, and so on. The TRP transmits indications of the transmission parameters to the UE (block 525). The TRP communicates with the UE using the transmission parameters (block 527). Collectively, blocks 523, 525, and 527 may be referred to as a third stage of a multi-stage technique for reduced sounding overhead of beamformed reference signals for massive MIMO and/or 3D MIMO systems (blocks 529).

Figure 5B:
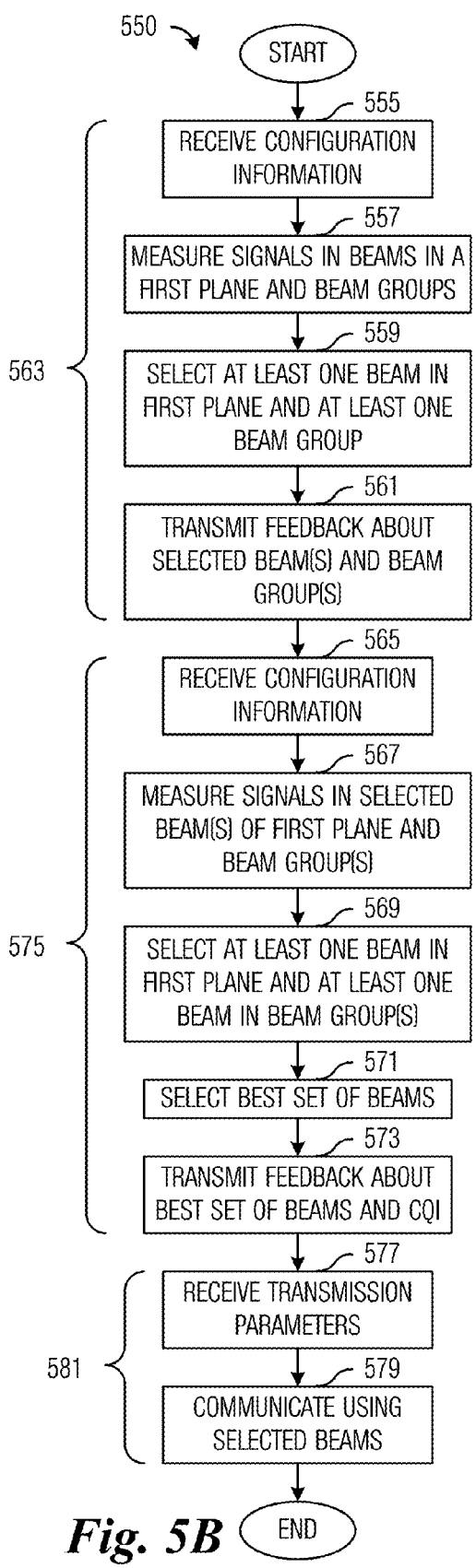
FIG. 5B illustrates a flow diagram of example operations occurring in a UE participating in the setting up and communicating using beamformed reference signals according to example embodiments described herein.

FIG. 5B illustrates a flow diagram of example operations 550 occurring in a UE participating in the setting up and communicating using beamformed reference signals. Operations 550 may be indicative of operations occurring in a UE as the UE participates in setting up and communicating using beamformed reference signals.

Operations 550 begin with the UE receiving first configuration information (block 555). The first configuration information may include information about a first plane and/or a second plane. The first configuration information may include reference signal configuration on a control channel, such as a BCCH or PBCH. The first configuration information may also include information about beams in the first and second planes, as well as beam group configuration. The reference signal configuration may be related to the CSI-RS on the first plane, such as the azimuth plane, for example. The reference signal configuration may be reception point (i.e., UE) specific or specific to a group of UEs. The UE measures beamformed reference signals sounded in the first plane and in accordance with beam groups, including at least a first beam group and a second beam group (block 557). The beamformed reference signals sounded in the first plane are constrained by the first and second beam groups. The UE selects at least one beam from the first plane and at least one beam group of the second plane that meet a first selection criterion (block 559). Examples of the first selection criterion may include received signal strength, SNR, SINR, channel capacity, and the like. The UE sends first feedback about the one or more selected beams and beam groups to the TRP (block 561). The first feedback may be in the form of indices of the one or more selected beams. Collectively, blocks 555, 557, 559, and 561 may be referred to as a first stage of a multi-stage technique for reduced sounding overhead of beamformed reference signals for massive MIMO and/or 3D MIMO systems (blocks 563).

The UE receives second configuration information for the second plane (block 565). The second configuration information may include reference signal (such as CSI-RS) configuration on a control channel that may be a UE specific or a grouped UE specific control channel. The second configuration information may also include information about beam groups. The reference signal configuration may be related to the CSI-RS on the second plane, such as the elevation plane, for example. The reference signal may be sector and/or cell specific reference signals or UE specific reference signals. The UE measures signals in beam group(s) of the second plane oriented in accordance with the selected beams of the first plane (block 567). The UE selects at least one beam in the first plane and at least one beam in the second plane in accordance with a second selection criterion (block 569). Examples of the second selection criterion may include received signal strength, SNR, SINR, channel capacity, and the like. The UE selects a best set of beams (block 571). The best set of beams includes beams in the first plane and the second plane that best meet the first selection criterion and the second criterion. The UE sends second feedback about the set of best beams to the TRP (block 573). The second feedback may be in the form of indices of the set of best beams. The second feedback information may also include CQI for the set of best beams or for the overall channel and rank information. Collectively, blocks 565, 567, 569, 571, and 573 may be referred to as a second stage of a multi-stage technique for reduced sounding overhead of beamformed reference signals for massive MIMO and/or 3D MIMO systems (blocks 575).

The UE receives indications of transmission parameters from the TRP (block 577). The transmission parameters may include parameters, such as MCS level, beams selected in accordance with the feedback, PMI, rank, and so on. The UE communicates with the TRP using the transmission parameters (block 579). Collectively, blocks 577 and 579 may be referred to as a third stage of a multi-stage technique for reduced sounding overhead of beamformed reference signals for massive MIMO and/or 3D MIMO systems (blocks 581).

Figure 6:
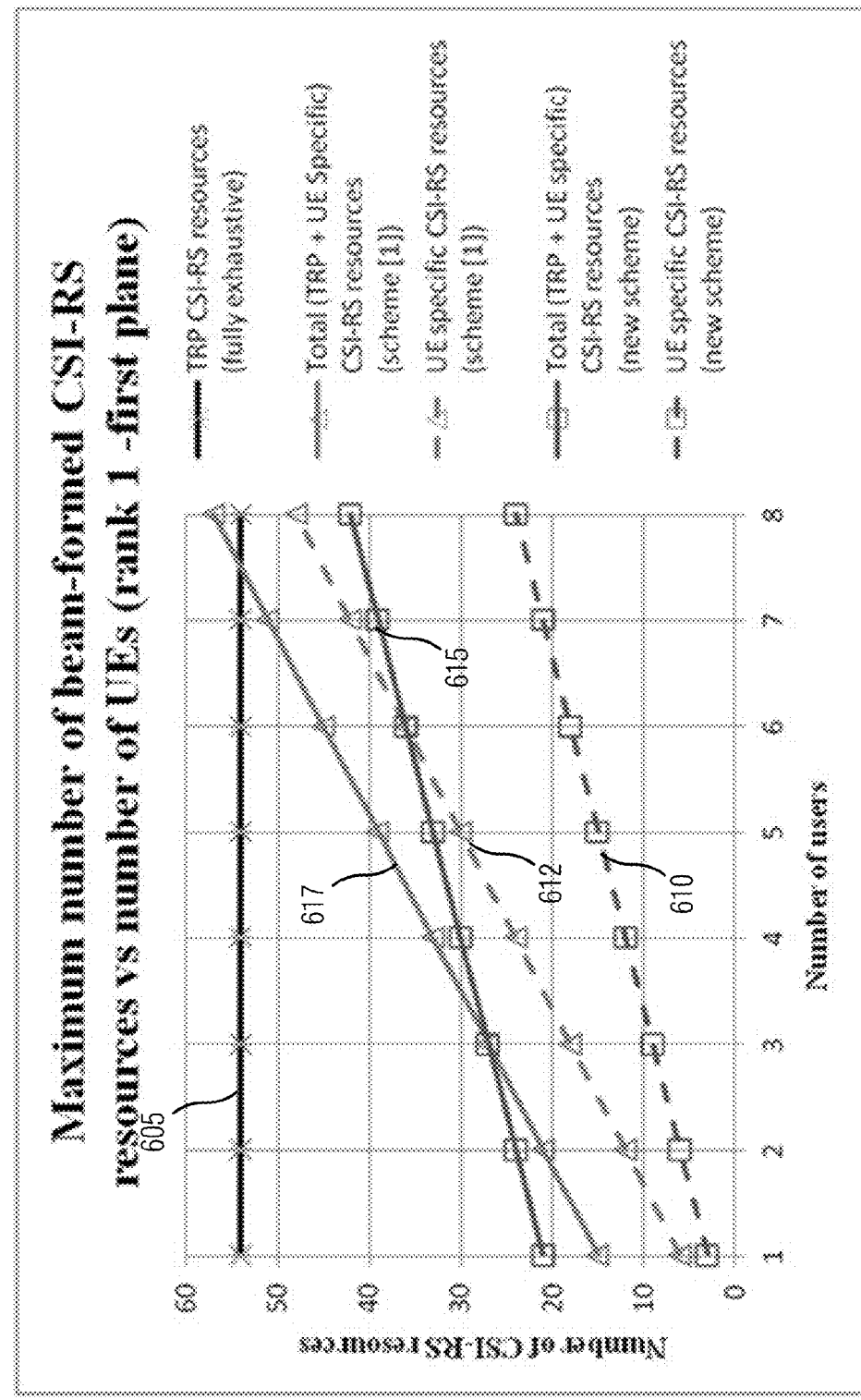
FIG. 6 illustrates a second plot of beamformed CSI-RS resources as a function of number of UEs, highlighting the sounding overhead reduction of the example embodiments as presented herein according to example embodiments described herein.

FIG. 6 illustrates a second plot 600 of beamformed CSI-RS resources as a function of number of UEs, highlighting the sounding overhead reduction of the example embodiments as presented herein. The data displayed in first plot 600 correspond to a communications system with 7 azimuth beams and 3 elevation beams, the same as in FIG. 2. A first trace 605 of second plot 600 represents TRP beamformed CSI-RS resources needed in a fully exhaustive sounding technique, a second trace 610 represents UE specific beamformed CSI-RS resources and a third trace 615 represents total (UE specific and TRP) beamformed CSI-RS resources according to the example embodiments as presented herein. Fourth trace 612 represents UE specific beamformed CSI-RS resources and a fifth trace 617 represents total (UE specific and TRP) beamformed CSI-RS resources according to the techniques presented in the co-assigned U.S. patent application US 2016/0134352A1. The rate of increase in the number of CSI-RS resources with increasing users (i.e., UEs) is significantly lower. The example presented in FIG. 6 corresponds to rank 1 in the first plane. If the rank in the first plane is higher, the amount of CSI-RS resources allocated to the UE in the second step of the example embodiments would be lower because the UE can choose the second plane beam groups.

According to an example embodiment, a UE is able to determine if sweeping in the second plane is to occur. The UE may determine that it is not practical or needed to perform sweeping in the second plane. Instead of sweeping in the second plane, the UE may request for the commencement of transmissions based in feedback provided regarding the first plane. The request is viewed as a start transmissions request. As an illustrative example, the link budget of the UE is sufficiently high using the selected first plane beam(s) and second plane beam group(s). This is especially true for UEs that are in close proximity with the TRP. As another illustrative example, the received signal level of the UE from different second plane beam groups (during the first stage of the multi-stage technique) is changing too rapidly (e.g., faster than a configured feedback rate for measurements of the second plane signals) and consequently changing the channel response. Examples of such situations include: the UE being located on a moving platform, such as an elevator, escalator, and so on, or items, objects, or reflectors near the UE are moving and changing the channel response in the second plane direction.

Figure 7:
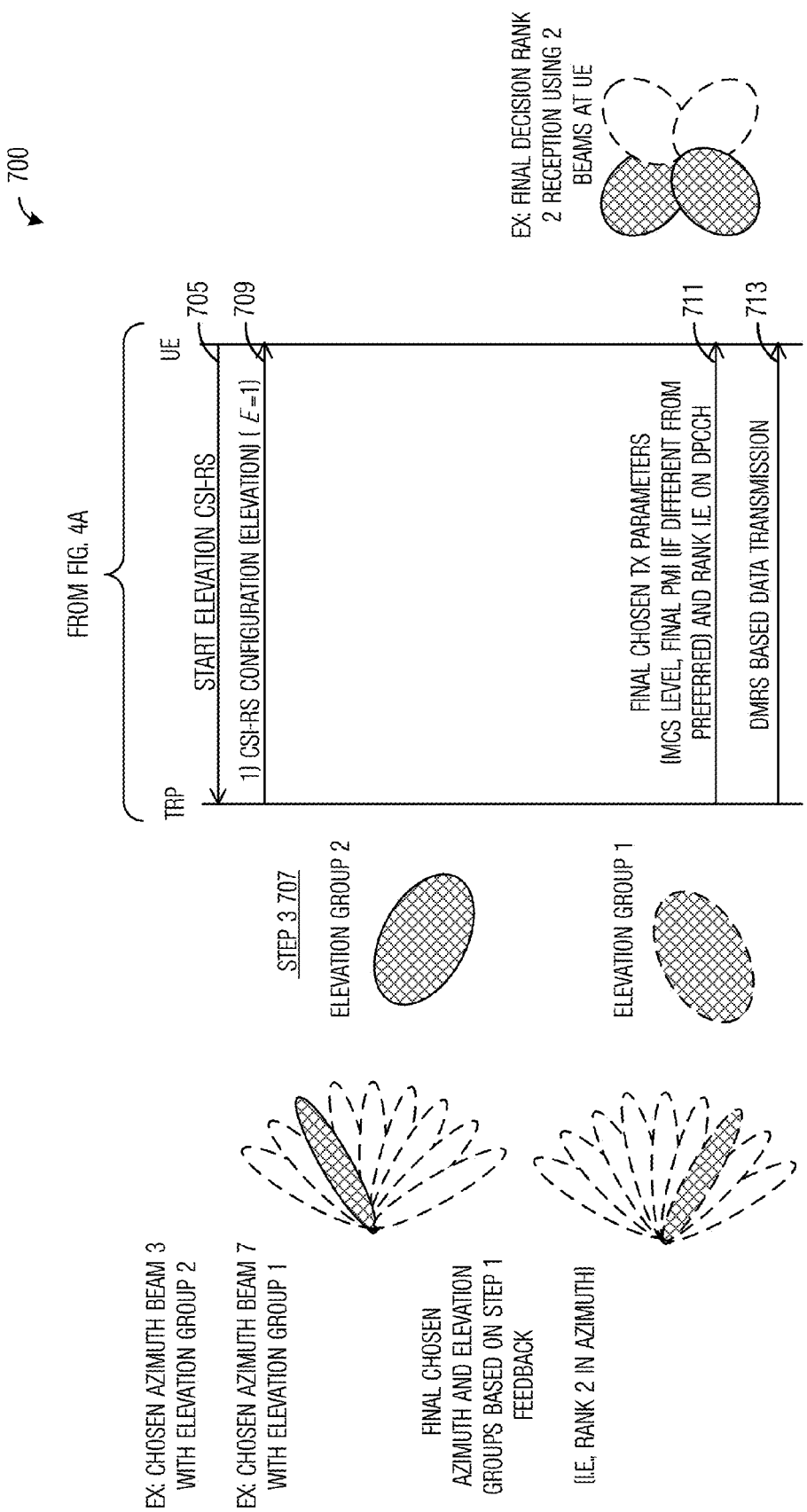
FIG. 7 illustrates a diagram highlighting a portion of communications exchanged and processing performed by a TRP and a UE participating in an example multi-stage technique for reducing overhead of beamformed reference signals for massive MIMO and/or 3D MIMO systems, where sweeping in a second plane is omitted according to example embodiments described herein.

FIG. 7 illustrates a diagram 700 highlighting a portion of communications exchanged and processing performed by a TRP and a UE participating in an example multi-stage technique for reducing overhead of beamformed reference signals for massive MIMO and/or 3D MIMO systems, where sweeping in a second plane is omitted. Diagram 700 displays communications and processing occurring after the first stage of the example multi-stage technique, which may be as illustrated in FIG. 4A.

After completion of the first stage of the multi-stage technique, the UE informs the TRP to start beamformed reference signal sweeping in the second plane, i.e., the second stage of the multi-stage technique (event 705). However, the TRP may not be able to satisfy the request due to a number of different reasons, including being temporarily or permanently incapable of beamformed reference signal sweeping in the second plane. The TRP elects to perform transmissions based solely on the feedback of the UE, i.e., the third stage of the multi-stage technique. The third stage 707 of the multi-stage technique begins when the TRP transmits CSI-RS configuration information for the second plane to the UE (event 709). The CSI-RS configuration information includes an indicator E (of the number of beams to be swept in the second stage) and when E is set to 1 this indicates that second plane sweeping is being omitted in the second stage. The TRP transmits the final transmission parameters, such as MCS level, TRP beams selected in accordance with the feedback information, PMI, rank, and so on, to the UE (event 711). The TRP then transmits a DMRS based data transmission to the UE (event 713).

Figure 8:
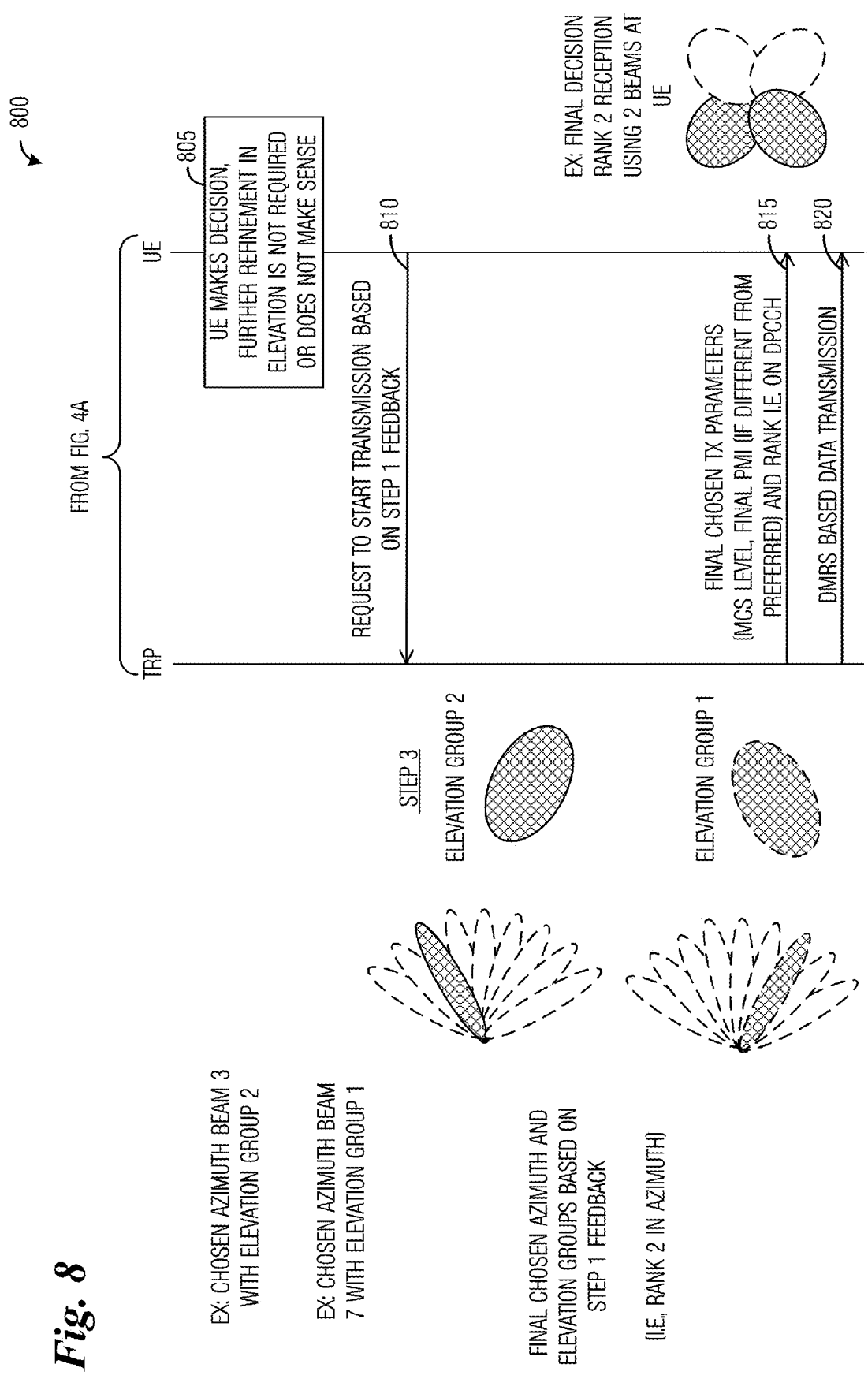
FIG. 8 illustrates a diagram highlighting a portion of communications exchanged and processing performed by a TRP and a UE participating in an example multi-stage technique for reducing overhead of beamformed reference signals for massive MIMO and/or 3D MIMO systems, where the UE requests that transmissions start based on feedback provided at the end of the first stage of the multi-stage technique according to example embodiments described herein.

FIG. 8 illustrates a diagram 800 highlighting a portion of communications exchanged and processing performed by a TRP and a UE participating in an example multi-stage technique for reducing overhead of beamformed reference signals for massive MIMO and/or 3D MIMO systems, where the UE requests that transmissions start based on feedback provided at the end of the first stage of the multi-stage technique. Diagram 800 displays communications and processing occurring after the first stage of the example multi-stage technique, which may be as illustrated in FIG. 4A.

After completion of the first stage of the multi-stage technique, the UE determines that further refinement in the second plane (e.g., the elevation plane) is not required or does not make sense (block 805). The UE transmits a request to the TRP, requesting that the TRP commence transmissions based on feedback provided by the UE in the first stage of the multi-stage technique, such as during event 417 of FIG. 4A (event 810). The request is viewed as a start transmissions request. The TRP transmits final transmission parameters, such as MCS level, beams selected in accordance with the feedback information, PMI, rank, and so on, to the UE (event 815). The TRP transmits a DMRS based data transmission to the UE (event 820).

Figure 9:
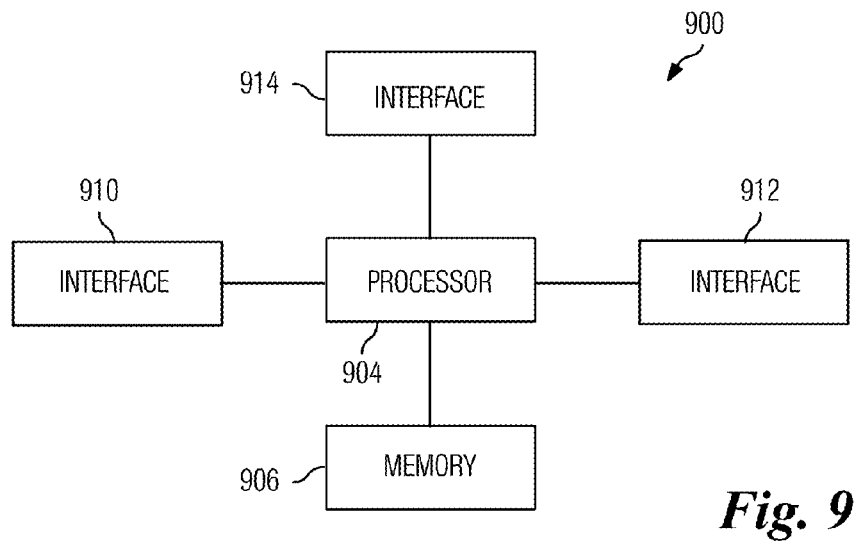
FIG. 9 illustrates a block diagram of an embodiment processing system for performing methods described herein.

FIG. 9 illustrates a block diagram of an embodiment processing system 900 for performing methods described herein, which may be installed in a host device. As shown, the processing system 900 includes a processor 904, a memory 906, and interfaces 910-914, which may (or may not) be arranged as shown in FIG. 9. The processor 904 may be any component or collection of components adapted to perform computations and/or other processing related tasks, and the memory 906 may be any component or collection of components adapted to store programming and/or instructions for execution by the processor 904. In an embodiment, the memory 906 includes a non-transitory computer readable medium. The interfaces 910, 912, 914 may be any component or collection of components that allow the processing system 900 to communicate with other devices/components and/or a user. For example, one or more of the interfaces 910, 912, 914 may be adapted to communicate data, control, or management messages from the processor 904 to applications installed on the host device and/or a remote device. As another example, one or more of the interfaces 910, 912, 914 may be adapted to allow a user or user device (e.g., personal computer (PC), etc.) to interact/communicate with the processing system 900. The processing system 900 may include additional components not depicted in FIG. 9, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 10:
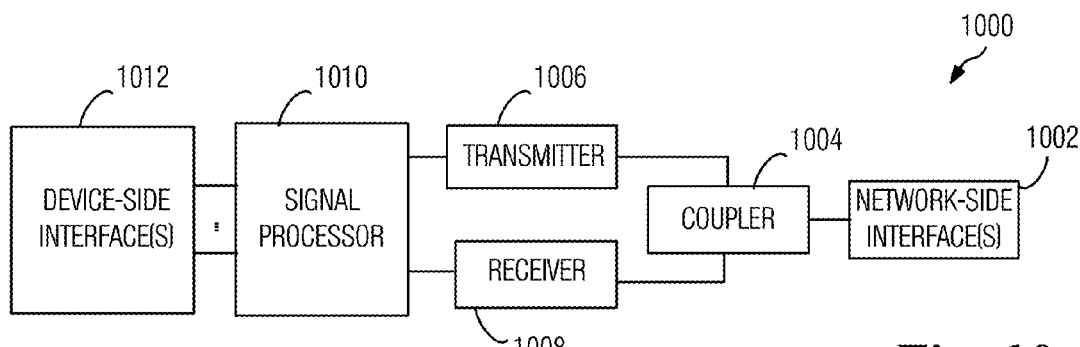
FIG. 10 illustrates a block diagram of a transceiver adapted to transmit and receive signaling over a telecommunications network according to example embodiments described herein.

In some embodiments, one or more of the interfaces 910, 912, 914 connects the processing system 900 to a transceiver adapted to transmit and receive signaling over the telecommunications network. FIG. 10 illustrates a block diagram of a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor low may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor low and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a selecting unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for operating a transmission point, the method comprising:
   transmitting, by the transmission point, a plurality of first directional reference signals, the plurality of first directional reference signals sweeping different first beams in a first plane which are constrained by a first beam group of a second plane;
   transmitting, by the transmission point, a plurality of second directional reference signals, the plurality of second directional reference signals sweeping the different first beams of the first plane which are constrained by a second beam group of the second plane;
   receiving from a reception point, by the transmission point, a request for the transmission point to commence operations in the second plane and a first feedback, the first feedback indicating at least one first beam of the first plane and at least one beam group of the second plane, where measurements of reference signals in the at least one first beam and the at least one beam group of the second plane satisfy a first selection criterion; and
   when the transmission point is capable of performing beam sweeping in the second plane,
      transmitting, by the transmission point, a plurality of third directional reference signals, the plurality of third directional reference signals oriented in accordance with the at least one first beam and sweeping in the at least one beam group of the second plane, and
      receiving, by the transmission point, a second feedback from the reception point, the second feedback indicating that at least one third directional reference signal meets a second selection criterion.

2. The method of claim 1, further comprising transmitting first configuration information for the first and second directional reference signals transmitted in the first plane, the first configuration information includes at least one of a number of directional reference signals in each plane, a number of repetitions of the first and second directional reference signals in each plane, an indication of a feedback method for the reception point, a downlink transmission capability of the transmission point, a configuration of beam groups in the second plane, and a resource location for the directional reference signals.

3. The method of claim 1, further comprising transmitting second configuration information for the third directional reference signals transmitted in the second plane, the second configuration information includes at least one of a number of different first plane beams, a number of second plane beams for each first plane beam, a number of reference signal repetitions per second plane beam, resource locations of different reference signals, a feedback method indicator, and a maximum rank of the transmission point in the second plane.

4. The method of claim 1, wherein the second feedback comprises channel quality indicators for the at least one third directional reference signal, and wherein the method further comprises:
 selecting transmission parameters in accordance with the channel quality indicators; and
 transmitting an indication of the transmission parameters to the reception point.

5. The method of claim 4, wherein the indication of the transmission parameters comprises at least one of a modulation and coding scheme (MCS) level, a beam index of a directional reference signal selected in accordance with the channel quality indicators, a precoding matrix indicator (PMI), and a rank indicator (RI).

6. The method of claim 1, further comprising when the transmission point is incapable of performing beam sweeping in the second plane:
 transmitting a beamformed reference signal configuration to the reception point, the beamformed reference signal configuration including an indication that the transmission point is not capable of operations in the second plane.

7. The method of claim 6, further comprising transmitting data to the reception point in accordance with the first feedback.

8. The method of claim 1, further comprising:
 receiving a start data transmission request from the reception point, the start data transmission request indicating to the transmission point to commence communications with the reception point in accordance with the first feedback; and
 transmitting information to the reception point in accordance with the first feedback.

9. A method for operating a reception point, the method comprising:
 receiving, by the reception point, a plurality of first directional reference signals and a plurality of second directional reference signals, the plurality of first directional reference signals sweeping different first beams in a first plane which are constrained by a first beam group of a second plane, the plurality of second directional reference signals sweeping the different first beams of the first plane which are constrained by a second beam group of the second plane;
 selecting, by the reception point, at least one first selected directional reference signal from at least one of the plurality of first and second directional reference signals that meets a first selection criterion, and at least one beam group associated with the at least one first selected directional reference signal; and
 transmitting, by the reception point, a first feedback indicating the at least one first selected directional reference signal and the at least one beam group associated with the at least one first selected directional reference signal.

10. The method of claim 9, further comprising:
 receiving, by the reception point, a plurality of third directional reference signals sweeping the at least one beam group as indicated in the first feedback;
 selecting, by the reception point, at least one second selected directional reference signal from the plurality of third directional reference signals that meet a second selection criterion; and
 transmitting, by the reception point, a second feedback indicating the at least one second selected directional reference signal.

11. The method of claim 10, wherein the second feedback also indicates channel quality indicators for the at least one second selected directional reference signal.

12. The method of claim 10, wherein the second feedback comprises beam indices corresponding to directional reference signals in a first subset of the at least one first selected directional reference signal and the at least one second selected directional reference signal.

13. The method of claim 10, wherein the second feedback comprises at least one of a first precoding matrix indicator for a first subset of the at least one first selected directional reference signal and a second precoding matrix indicator for the at least one second selected directional reference signal.

14. The method of claim 10, wherein each one of the first selection criterion and the second selection criterion comprises one of a received signal strength, a signal to noise ratio (SNR), a signal to interference plus noise ratio (SINR), and a channel capacity.

15. The method of claim 9, further comprising receiving configuration information for directional reference signals in the first and second planes, the configuration information including at least one of a number of directional reference signals in each plane, a number of repetitions of the directional reference signals in each plane, an indicator of a feedback method for the reception point, a downlink transmission capability of a transmission point, a configuration of beam groups in the second plane, and a resource location for the directional reference signals.

16. A transmission point comprising:
 a processor; and
 a computer readable storage medium storing programming for execution by the processor, the programming including instructions to configure the transmission point to:
  transmit a plurality of first directional reference signals, the plurality of first directional reference signals sweeping different first beams in a first plane which are constrained by a first beam group of a second plane,
  transmit a plurality of second directional reference signals, the plurality of second directional reference signals sweeping the different first beams of the first plane which are constrained by a second beam group of the second plane,
  receive, from a reception point, a request for the transmission point to commence operations in the second plane and a first feedback, the first feedback indicating at least one first beam of the first plane and at least one beam group of the second plane, where measurements of reference signals in the at least one first beam and the at least one beam group of the second plane satisfy a first selection criterion, and
  when the transmission point is capable of performing beam sweeping in the second plane,
   transmit a plurality of third directional reference signals, the plurality of third directional reference signals oriented in accordance with the at least one first beam and sweeping in the at least one beam group of the second plane, and
   receive a second feedback from the reception point, the second feedback indicating that at least one third directional reference signal meets a second selection criterion.

17. The transmission point of claim 16, wherein the programming includes instructions to configure the transmission point to transmit first configuration information for the first and second directional reference signals transmitted in the first plane, the first configuration information includes at least one of a number of directional reference signals in each plane, a number of repetitions of the first and second directional reference signals in each plane, an indication of a feedback method for the reception point, a downlink transmission capability of the transmission point, a configuration of beam groups in the second plane, and a resource location for the directional reference signals.

18. The transmission point of claim 16, wherein the second feedback comprises channel quality indicators for the at least one third directional reference signal, and wherein the programming includes instructions to configure the transmission point to select transmission parameters in accordance with the channel quality indicators, and transmit an indication of the transmission parameters to the reception point.

19. The transmission point of claim 18, wherein the indication of the transmission parameters comprises at least one of a modulation and coding scheme (MCS) level, a beam index of a directional reference signal selected in accordance with the channel quality indicators, a precoding matrix indicator (PMI), and a rank indicator (RI).

20. The transmission point of claim 16, wherein the programming includes instructions to configure the transmission point to, when the transmission point is incapable of performing beam sweeping in the second plane, transmit a beamformed reference signal configuration to the reception point, the beamformed reference signal configuration including an indication that the transmission point is not capable of operations in the second plane.

21. The transmission point of claim 16, wherein the programming includes instructions to configure the transmission point to receive a start data transmission request from the reception point, the start data transmission request indicating to the transmission point to commence communications with the reception point in accordance with the first feedback, and transmit information to the reception point in accordance with the first feedback.

22. A reception point comprising:
a processor; and
a computer readable storage medium storing programming for execution by the processor, the programming including instructions to configure the reception point to:

receive a plurality of first directional reference signals and a plurality of second directional reference signals, the plurality of first directional reference signals sweeping different first beams in a first plane which are constrained by a first beam group of a second plane, the plurality of second directional reference signals sweeping the different first beams of the first plane which are constrained by a second beam group of the second plane, select at least one first selected directional reference signal from at least one of the plurality of first and second directional reference signals that meets a first selection criterion, and at least one beam group associated with the at least one first selected directional reference signal, and transmit a first feedback indicating the at least one first selected directional reference signal and the at least one beam group associated with the at least one first selected directional reference signal.

23. The reception point of claim 22, wherein the programming includes instructions to configure the reception point to receive a plurality of third directional reference signals sweeping the at least one beam group as indicated in the first feedback, select at least one second selected directional reference signal from the plurality of third directional reference signals that meet a second selection criterion, and transmit a second feedback indicating the at least one second selected directional reference signal.

24. The reception point of claim 22, wherein the programming includes instructions to configure the reception point to receive configuration information for directional reference signals in the first and second planes, the configuration information including at least one of a number of directional reference signals in each plane, a number of repetitions of the directional reference signals in each plane, an indicator of a feedback method for the reception point, a downlink transmission capability of a transmission point, a configuration of beam groups in the second plane, and a resource location for the directional reference signals.

* * * * *